US009660894B2

(12) United States Patent
Komiya et al.

(10) Patent No.: US 9,660,894 B2
(45) Date of Patent: May 23, 2017

(54) NETWORK ANALYSIS ASSISTANCE DEVICE, NETWORK ASSESSMENT DEVICE, NETWORK ANALYSIS ASSISTANCE METHOD, NETWORK ASSESSMENT METHOD, NETWORK ANALYSIS ASSISTANCE PROGRAM AND NETWORK ASSESSMENT PROGRAM

(75) Inventors: Noriyuki Komiya, Tokyo (JP); Masanori Nakata, Tokyo (JP); Akihiro Ochiai, Kanagawa (JP)

(73) Assignee: Mitsubishi Electric Corporation, Tokyo (JP)

( * ) Notice: Subject to any disclaimer, the term of this patent is extended or adjusted under 35 U.S.C. 154(b) by 538 days.

(21) Appl. No.: 14/112,069

(22) PCT Filed: Apr. 18, 2012

(86) PCT No.: PCT/JP2012/060510
§ 371 (c)(1),
(2), (4) Date: Oct. 16, 2013

(87) PCT Pub. No.: WO2012/144537
PCT Pub. Date: Oct. 26, 2012

(65) Prior Publication Data
US 2014/0047112 A1    Feb. 13, 2014

(30) Foreign Application Priority Data

Apr. 19, 2011 (JP) ................................ 2011-093538
Jun. 27, 2011 (JP) ................................ 2011-142321

(51) Int. Cl.
*G06F 15/173* (2006.01)
*H04L 12/26* (2006.01)
*H04L 12/24* (2006.01)

(52) U.S. Cl.
CPC ............ *H04L 43/50* (2013.01); *H04L 41/064* (2013.01); *H04L 41/069* (2013.01);
(Continued)

(58) Field of Classification Search
CPC ...................................................... H04L 43/50
See application file for complete search history.

(56) References Cited

U.S. PATENT DOCUMENTS 6,012,095 A     1/2000  Thompson et al.
6,513,129 B1 *  1/2003  Tentij ................. H04L 41/0631
                                                714/26

(Continued)

FOREIGN PATENT DOCUMENTS

EP    0 994 602 A2    4/2000
EP    1 469 394 A1   10/2004
(Continued)

OTHER PUBLICATIONS

Standards document BACnet ASHRAE 135.1P Method of Test Conformance to BACnet (Sep. 21, 2000) to ASHRAE. ("ASHRAE").*

(Continued)

*Primary Examiner* — June Sison
(74) *Attorney, Agent, or Firm* — Posz Law Group, PLC

(57) ABSTRACT

A first electronic message collector collects electronic messages travelling on a first network and stores the electronic messages in a first storage. A second electronic message collector collects electronic messages travelling on a second network and stores the electronic messages in a second storage. An electronic message associator retains a mapping table in which the correlation, or similar, between electronic messages travelling from the first network to a gateway device and electronic messages travelling from the gateway device the second network are defined. The electronic mes- (Continued)

sage associator references the mapping table and associates the electronic messages stored in the second storage with the electronic messages stored in the first storage. From the result of the above-mentioned association, a status analyzer determines whether or not receipt of electronic message between the first network and the second network is accomplished normally.

13 Claims, 26 Drawing Sheets

(52) U.S. Cl.
CPC ........ *H04L 41/142* (2013.01); *H04L 43/0852* (2013.01); *H04L 41/022* (2013.01); *H04L 41/0226* (2013.01); *H04L 41/0677* (2013.01); *H04L 41/22* (2013.01)

(56) References Cited

U.S. PATENT DOCUMENTS

| | | | | |
|---|---|---|---|---|
| 7,165,191 | B1* | 1/2007 | Vakrat | G06F 11/3688 714/38.1 |
| 2004/0059814 | A1* | 3/2004 | Komiya | G06F 17/30569 709/224 |
| 2004/0194059 | A1* | 9/2004 | Akella | G06F 8/61 717/118 |
| 2005/0195390 | A1* | 9/2005 | Jeon | G06F 11/3688 356/237.2 |
| 2006/0058923 | A1* | 3/2006 | Kruk | G05B 19/042 700/275 |
| 2006/0067209 | A1* | 3/2006 | Sheehan | H04L 29/08846 370/216 |
| 2006/0092861 | A1* | 5/2006 | Corday | H04L 67/34 370/256 |
| 2007/0233323 | A1* | 10/2007 | Wiemeyer | G05B 15/02 700/276 |
| 2008/0231437 | A1* | 9/2008 | Singhal | F24F 11/0009 340/514 |
| 2010/0283606 | A1* | 11/2010 | Tsypin | G06Q 30/02 340/540 |
| 2011/0061015 | A1* | 3/2011 | Drees | G05B 15/02 715/771 |
| 2011/0144777 | A1* | 6/2011 | Firkins | G05B 23/027 700/80 |
| 2012/0004739 | A1* | 1/2012 | Sato | H04L 41/044 700/7 |

FOREIGN PATENT DOCUMENTS

| | | |
|---|---|---|
| JP | 2002-344448 A | 11/2002 |
| JP | 2006-042164 A | 2/2006 |
| JP | 2006-129283 A | 5/2006 |
| JP | 2007-038904 A | 2/2007 |
| JP | 2008-158716 A | 7/2008 |
| JP | 2009-253464 A | 10/2009 |
| JP | 2011-254179 A | 12/2011 |
| WO | 2010/045961 A1 | 4/2010 |

OTHER PUBLICATIONS

Extended European Search Report dated Jan. 19, 2015 issued in corresponding EP patent application No. 12774131.2.
International Search Report of the International Searching Authourity mailed Jun. 19, 2012 for corresponding international application No. PCT/JP2012/060512 (and English translation).

* cited by examiner

| FIRST NETWORK | | | DIRECTION | SECOND NETWORK | |
|---|---|---|---|---|---|
| WriteProperty | BO | 001 | DOWN | OPERATION | RUNNING/ STOPPED |
| WriteProperty | MO | 001 | DOWN | OPERATION | OPERATING MODE |
| WriteProperty | MO | 002 | DOWN | OPERATION | SET TEMPERATURE |
| COVNotification | BI | 001 | UP | OPERATION MONITOR RESPONSE | RUNNING/ STOPPED |
| ... | ... | ... | ... | ... | ... |

| REQUEST | | RESPONSE | |
|---|---|---|---|
| OPERATION | RUNNING/ STOPPED | OPERATION MONITOR RESPONSE | RUNNING/ STOPPED |
| OPERATION | OPERATING MODE | OPERATION MONITOR RESPONSE | OPERATING MODE |
| INQUIRY | EQUIPMENT STATUS | MONITOR RESPONSE | EQUIPMENT STATUS |
| ... | ... | ... | ... |

| GROUP NUMBER | EQUIPMENT NUMBER |
|---|---|
| 1 | 1,2 |
| 2 | 3 |
| 3 | 4,5,6 |
| ... | ... |

| FIRST NETWORK | DIRECTION | SECOND NETWORK |
|---|---|---|
| WriteProperty | DOWN | OPERATION COMMAND SENT |
| ReadProperty | DOWN | EQUIPMENT STATUS INQUIRY ISSUED |
| ComplexACK | UP | OPERATION/EQUIPMENT STATUS MONITOR RESPONSE |
| COVNotification | UP | STATUS CHANGE NOTIFICATION |
| EvenNotification | UP | EVENT NOTIFICATION |
| ... | ... | ... |

~152

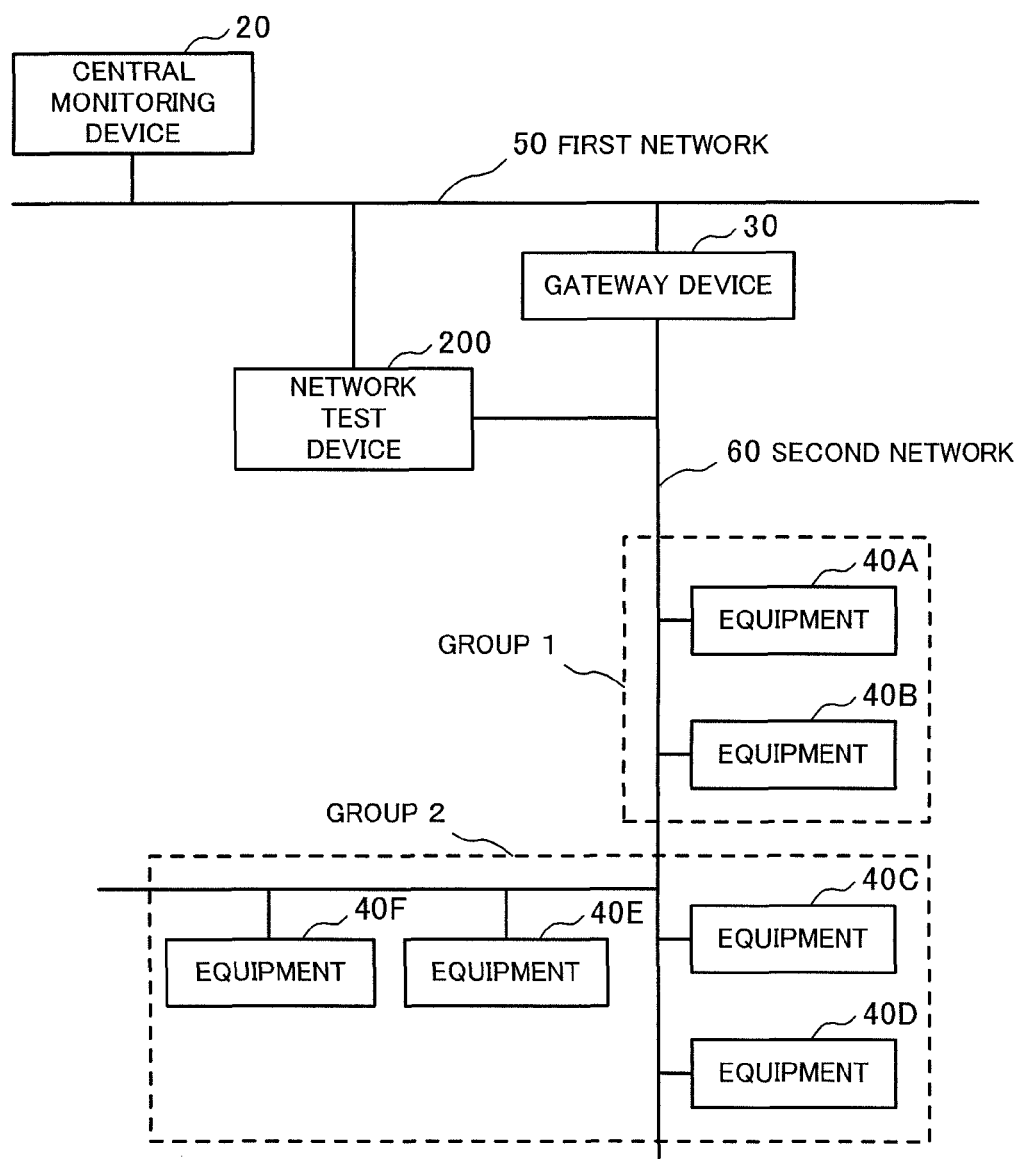

| INPUT ELECTRONIC MESSAGE | OUTPUT ELECTRONIC MESSAGE | |
|---|---|---|
| OBJECT | COMMAND CLASSIFICATION | EQUIPMENT ADDRESS |
| BO0101 | 0001 (RUNNING/STOPPED SETTING) | 51,52 |
| BO0102 | | 55,56,101,102 |
| MO0201 | 0002 (OPERATING MODE SETTING) | 51,52 |
| MO0202 | | 55,56,101,102 |
| MO0301 | 0003 (TEMPERATURE SETTING) | 51,52 |
| MO0302 | | 55,56,101,102 |
| ... | ... | ... |

NETWORK ANALYSIS ASSISTANCE DEVICE, NETWORK ASSESSMENT DEVICE, NETWORK ANALYSIS ASSISTANCE METHOD, NETWORK ASSESSMENT METHOD, NETWORK ANALYSIS ASSISTANCE PROGRAM AND NETWORK ASSESSMENT PROGRAM

CROSS REFERENCE TO RELATED APPLICATIONS

This application is a U.S. national stage application of International Application No. PCT/JP2012/060510 filed on Apr. 18, 2012, which claims priority from, and incorporates by reference, JP Application Nos. 2011-093538, filed on Apr. 19, 2011 and 2011-142321, filed on Jun. 27, 2011.

TECHNICAL FIELD

The present invention relates to a network analysis assistance device, a network test device, a network analysis assistance method, a network test method, a network analysis assistance program and a network test program.

BACKGROUND ART

In recent years, a building management system has been know that comprehensively manages, observes and controls equipment such as air conditioning equipment, lighting equipment and/or the like installed in a building. In this type of building management system, in general a central monitoring device connected to a higher-order network controls, via a gateway, multiple equipment connected to a lower-order network (for example, see Patent Literature 1).

The above-described central monitoring device, gateway device and various equipments constituting a building management system in general are supplied from various different vendors. It is possible that each vendor has sufficiently accomplished action validation testing on the devices that vendor supplies, but it is not easy to accomplish action validation testing sufficiently encompassing the state after the system has actually been built.

Consequently, there are numerous cases in which a system is built and then unforeseen troubles arise after actual operations begin, and in responding to these, the necessity arises of collecting and analyzing electronic messages flowing on the network in order to confirm that state and specify the locations of troubles occurring and the content of the troubles. That is to say, in the higher-order network and the lower-order network, it is necessary to investigate what kinds of phenomena are occurring in each and what the respective cause-and-effect relationships are.

CITATION LIST

Patent Literature

Patent Literature 1: Unexamined Japanese Patent Application Kokai Publication No. 2006-129283.

SUMMARY OF INVENTION

Technical Problem

In this type of technology conventionally, the electronic messages of multiple networks were respectively collected separately. Consequently, the operator needs to accomplish work linking the collected electronic messages of the respective networks, creating the problem that this is extremely labor intensive.

Conventionally, in communications tests between multiple networks having this kind of differing protocols, it was necessary for the operator to create test electronic messages manually, which was extremely labor intensive. In addition, a great deal of labor was also necessary in the work of determining whether or not the test results are correct.

In consideration of the foregoing, it is a first objective of the present invention to provide a network analysis assistance device and/or the like for collecting and associating electronic messages travelling along multiple networks having different protocols, and from the results of this association to determine whether or not mutually sending and receiving electronic messages between the multiple networks is accomplished normally.

In addition, it is a second objective of the present invention to provide a network test device and/or the like for automatically accomplishing creation of test electronic messages and assisting in test verification, in communications tests for multiple networks having different protocols.

Solution to Problem

In order to achieve the above-described first objective, the network analysis assistance device according to the present invention is a network analysis assistance device for assisting analysis of networks in a system comprising a first device, a gateway device and a second device, the network analysis assistance device comprising:

first electronic message collection means connecting to a first network to which the first device and the gateway device are connected, and collecting electronic messages traveling on the first network;

second electronic message collection means connecting to a second network to which the gateway device and the second device are connected, and collecting electronic messages traveling on the second network;

a mapping table in which the correlation between an electronic message travelling from the first network to the gateway device and an electronic message travelling on the second network from the gateway device, and the correlation between an electronic message travelling from the second network to the gateway device and an electronic message travelling on the first network from the gateway device, are defined;

electronic message association means associating electronic messages collected by the first electronic message collection means and electronic messages collected by the second electronic message collection means, with reference to the mapping table; and status analysis means determining whether or not receipt of electronic messages between the first network and the second network is accomplished normally, from the results of the association by the electronic message association means.

In addition, in order to achieve the above-described second objective, the network test device according to the present invention is a network test device for testing operation of a gateway device connecting a first network and a second network, this network test device comprising:

first electronic message receiving means connected to the first network for receiving electronic messages traveling on the first network;

second electronic message receiving means connected to the second network for receiving electronic messages traveling on the second network;

received electronic message storage means storing electronic messages respectively received by the first electronic message receiving means and the second electronic message receiving means;

mapping information creating means estimating the correlation between input electronic messages input into the gateway device from the first network and output electronic messages output on the second network from the gateway device, based on multiple electronic messages stored in the received electronic message storage means, and creating mapping information consisting of information obtained as a result of estimation;

an object information database in which properties and property values are correlated in levels for all or a portion of the objects managed by the gateway device;

test electronic message creating means creating an input electronic message for test based on the mapping information and the object information database;

electronic message sending means outputting the input electronic message for test to the first network; and test result determining means determining whether or not the test results are normal, based on one or multiple electronic messages stored in the received electronic message storage means after output of the input electronic message for test by the electronic message sending means, and the mapping information.

Advantageous Effects of Invention

With the present invention, it is possible to accomplish collection and association of electronic messages travelling across multiple networks and from the results of that association to determine whether or not receipt of the electronic messages among the multiple different networks was accomplished normally, so maintenance work in an equipment management system or the like can be made more efficient.

In addition, with the present invention, test data for accomplishing communications tests on multiple networks having differing protocols is automatically created and assists in test verification, so it is possible to greatly reduce the burden on workers and to make maintenance work in the equipment management system or the like more efficient.

BRIEF DESCRIPTION OF DRAWINGS

FIG. 5 is a drawing showing one example of a mapping table according to Embodiment 1;

FIG. 6 is a drawing showing one example of a request-response rules table according to Embodiment 1;

FIG. 22 is a drawing showing an entire composition of an equipment management system that is the target of test by a network test device according to Embodiment 2 of the present invention;

DESCRIPTION OF EMBODIMENTS

Below, the preferred embodiments of the present invention are explained in detail with reference to the attached drawings.

Embodiment 1

Figure 1:
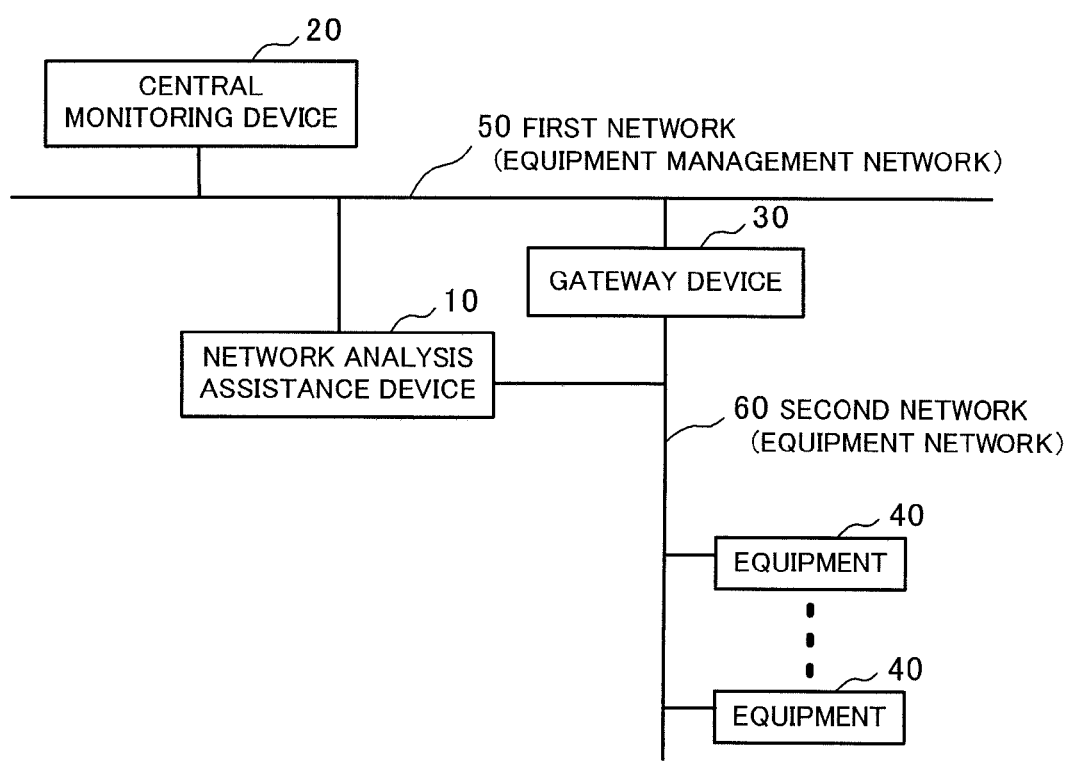
FIG. 1 is a drawing showing an entire composition of an equipment management system in which a network analysis assistance device according to Embodiment 1 of the present invention is incorporated.

FIG. 1 is a drawing showing an entire composition of an equipment management system in which a network analysis assistance device according to Embodiment 1 of the present invention is incorporated. This equipment management system is a system for controlling and managing equipment such as air conditioning equipment, lighting equipment and/or the like installed inside a building (a so-called building management system). As shown in FIG. 1, this equipment management system comprises a network analysis assistance device 10, a central monitoring device 20, a gateway device 30 and multiple pieces of equipment 40.

The central monitoring device 20 and the gateway device 30 are for example connected to a first network 50 (equipment management network) that is a higher-order network adhering to a communication protocol such as BACnet (A Data Communication Protocol for Building Automation and Control Networks) and/or the like. The gateway device 30 and the various pieces of equipment 40 are connected to a second network 60 (equipment network) that is a lower-order network adhering to a communication protocol that is unique to a vendor that is a supplier of each piece of equipment 40. The network analysis assistance device 10 is connected to both the first network 50 and the second network 60.

The central monitoring device 20 is provided with a CPU (Central Processing Unit), a ROM (Read Only Memory), a RAM (Random Access Memory), an external memory device (for example comprising a readable and writeable non-volatile semiconductor memory or hard disk drive and/or the like), an input device (for example comprising a keyboard, mouse, keypad, touch pad, touch panel and/or the like), a display device (for example comprising a CRT, a liquid crystal monitor or the like) and a prescribed communication interface and/or the like, although none of these is depicted in the drawings.

The central monitoring device 20 controls each piece of equipment 40 (for example, air conditioning equipment, lighting equipment and/or the like) via the gateway device 30. In this embodiment, the central monitoring device 20 is equivalent to a first device in the present invention and each piece of equipment 40 is equivalent to a second device in the present invention.

The gateway device 30 comprises a CPU, a ROM, a RAM, external memory device, a prescribed communication interface and/or the like, although none of these is depicted in the drawings.

When monitoring and/or the like of the operation and action statuses of each piece of equipment in the equipment system 40 is accomplished by the central monitoring device 20, a prescribed electronic message is output on the first network 50 from the central monitoring device 20. This electronic message is converted into a data format that can be processed by each piece of equipment 40 by the gateway device 30 and is then output on the second network 60 and delivered to each piece of equipment 40. On the other hand, electronic messages from each piece of equipment 40 are converted into a data format that can be processed by the central monitoring device 20 by the gateway device 30 and are then output on the first network 50 and delivered to the central monitoring device 20.

The central monitoring device 20 in this manner realizes various operation and monitoring and/or the like functions with respect to each piece of equipment 40 by sending electronic messages from the first network 50 to the second network 60 or receiving electronic messages sent to the first network 50 from the second network 60, via the gateway device 30.

That is to say, in order to understand the action status of this equipment management system, it is necessary to grasp the state of change in electronic messages accomplished via the gateway device 30, that is to say the input status of electronic messages from each network to the gateway device 30 and the output status of electronic messages from the gateway device 30 to each network. The network analysis assistance device 10 is provided with functions that simultaneously collect and analyze the various electronic messages from multiple networks, namely the first network 50 and the second network 60 to which the gateway device 30 is connected, associate the mutual electronic messages and exhibit the results thereof to the operator.

In addition, the network analysis assistance device 10 is provided with a function that determines from the results of the above-described association of electronic messages whether or not receipt of the electronic messages between multiple networks having differing protocols was accomplished normally and exhibits the results thereof to the operator. Through this, it is possible for the operator to easily understand the action status of this equipment management system and to easily and reliably recognize whether or not abnormalities have occurred.

The network analysis assistance device 10 possesses a hardware configuration similar to a hardware configuration of the central monitoring device 20. That is to say, the network analysis assistance device 10 comprises a CPU, a ROM, a RAM, an external memory device, an input device, a display device, a prescribed communication interface and/or the like, although none of these is depicted in the drawings. The various processes (described in detail below) executed by the network analysis assistance device 10 are realized by the CPU and/or the like executing prescribed programs stored in the ROM or the external memory device.

Figure 2:
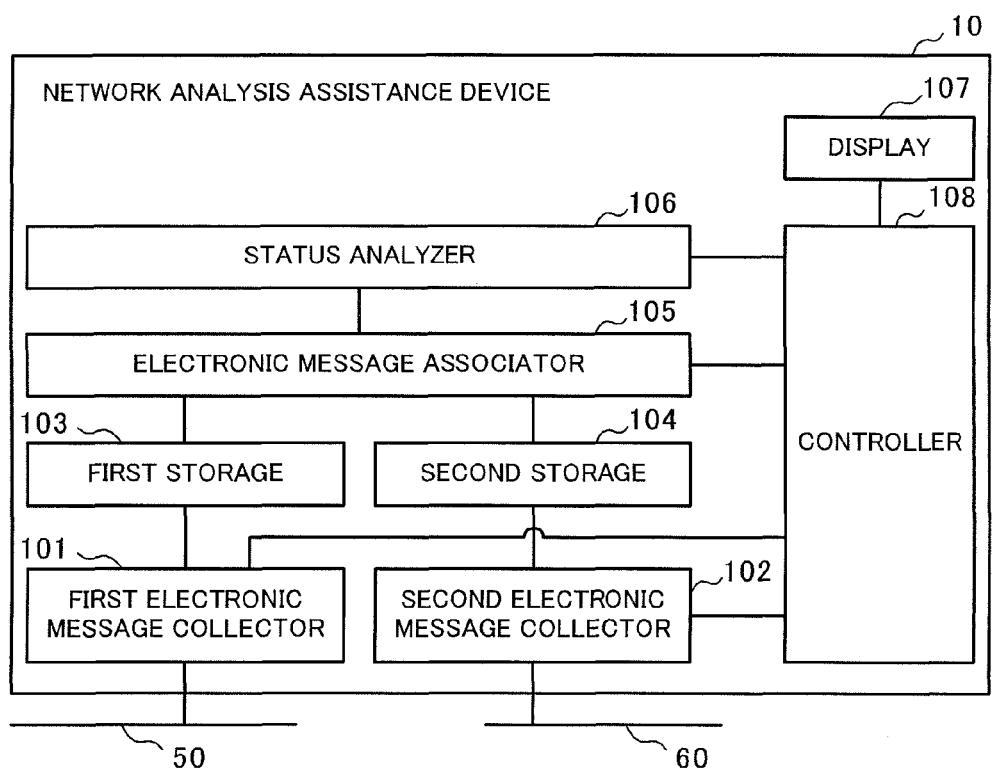
FIG. 2 is a block diagram showing a composition of the network analysis assistance device shown in FIG. 1.

The network analysis assistance device 10 functionally comprises a first electronic message collector 101, a second electronic message collector 102, a first storage 103, a second storage 104, an electronic message associator 105, a status analyzer 106, a display 107 and a controller 108 for controlling these components, as shown in FIG. 2.

Figure 3A:
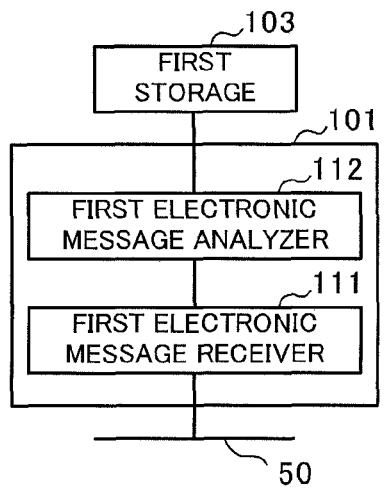
FIG. 3A is a block diagram showing a composition of a first electronic message collector shown in FIG. 2.

The first electronic message collector 101 comprises a first electronic message receiver 111 and a first electronic message analyzer 112, as shown in FIG. 3A. The first electronic message receiver 111 collects electronic messages traveling on the first network 50, that is to say electronic messages sent to the gateway device 30 from the central monitoring device 20 (electronic messages traveling in the downward direction of the first network 50), and electronic messages sent to the central monitoring device 20 from the gateway device 30 (electronic messages traveling in the upward direction of the first network 50). The first electronic message analyzer 112 analyzes electronic messages received by the first electronic message receiver 111 and stores information (electronic message information) for the received electronic messages in the first storage 103 in accordance with the analysis results thereof. The first electronic message analyzer 112 for example analyzes a direction of that electronic message (upward or downward), a session identifier, command contents and/or the like and stores the results thereof in chronological order in the first storage 103.

Figure 3B:
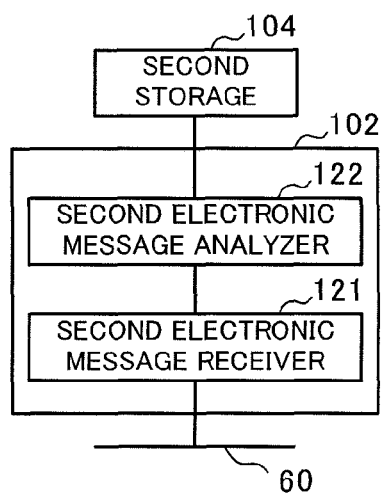
FIG. 3B is a block diagram showing a composition of a second electronic message collector shown in FIG. 2.

The second electronic message collector 102 comprises a second electronic message receiver 121 and a second electronic message analyzer 122, as shown in FIG. 3B. The second electronic message receiver 121 collects electronic messages traveling on the second network 60, that is to say electronic messages sent to the various pieces of equipment 40 from the gateway device 30 (electronic messages traveling in the downward direction of the second network 60), and electronic messages sent to the gateway device 30 from the various pieces of equipment 40 (electronic messages traveling in the upward direction of the second network 60). The second electronic message analyzer 122 analyzes electronic messages received by the second electronic message receiver 121 in a similar manner to the above-described first electronic message analyzer 112 and stores the results (electronic message information) thereof in chronological order in the second storage 104.

The first storage 103 and the second storage 104 do not necessarily need to be composed of physically different semiconductor memory or the like. Moreover, it would be fine for the first storage 103 and the second storage 104 to be composed of the same semiconductor memory or the like and to indicate the same memory region. In this case, identifying information indicating electronic message information for either the first network 50 side or the second network 60 side is appended to each electronic message information by the first electronic message analyzer 112 and the second electronic message analyzer 122.

Electronic message information adhering to the above-described BACnet, for example, is stored in the first storage 103, and electronic message information adhering to vender-specific communications protocol is stored in the second storage 104. The various pieces of electronic message information for example constitute records comprising constituent elements such as:

"electronic message acquisition time
+destination address
+sender address
+session identifier
+response necessity flag
+command (process contents)
+process target class identifier
+process target instance identifier
+process target property identifier
+process target property value"

and/or the like, and these records exist in the first storage 103 and the second storage 104 in the same respective number as the electronic messages collected by the first electronic message collector 101 and the second electronic message collector 102.

The electronic message associator 105 executes a process associating electronic messages stored in the first storage 103 and electronic messages stored in the second storage 104 (electronic message association process). The process results of the electronic message associator 105 are displayed on the display 107 via the controller 108.

Figure 4:
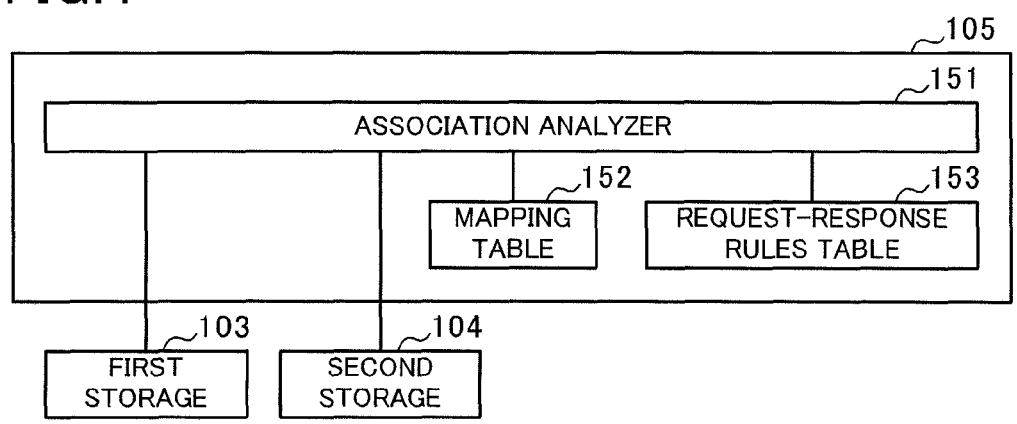
FIG. 4 is a block diagram showing a composition of an electronic message associator shown in FIG. 2.

FIG. 4 is a block diagram showing a composition of the electronic message associator 105. As shown in FIG. 4, the electronic message associator 105 comprises an association analyzer 151, a mapping table 152 and a request-response rules table 153. The mapping table 152 is a data table in which the correlation between electronic messages travelling from the first network 50 side to the second network 60 side and electronic messages travelling from the second network 60 side to the first network 50 side is defined using all or a portion of the constituent elements of the electronic messages. FIG. 5 shows one example of the mapping table.

In the example in FIG. 5, the correlation between "command (WriteProperty and/or the like)+process target class identifier (BO and/or the like)+process target instance identifier (001 and/or the like)", which are a portion of the constituent elements of the electronic message information on the first network 50 side, and "command (operation and/or the like)+process target property identifier (running/stopped and/or the like)", which are a portion of the constituent elements of the electronic message information on the second network 60 side, is defined.

The request-response rules table 153 is a data table in which the correspondence between a request electronic message and the response electronic message thereto in the same network (the second network 60 in this embodiment) is defined using all or a portion of the constituent elements of the electronic messages. FIG. 6 shows one example of the request-response rules table 153.

In the example in FIG. 6, the correlation between the "command+process target property identifier" (operation+running/stopped and/or the like) of the request electronic message on the second network 60 and the "command+process target property identifier" (operation monitor response+running/stopped and/or the like) of the response electronic message is defined.

The association analyzer 151 references these tables and associates electronic message information stored in the first storage 103 and electronic message information stored in the second storage 104.

Below, an electronic message association process accomplished by this association analyzer 151 is described. There are no restrictions on the execution timing of this electronic message association process, and it is possible for this process to be arbitrarily started by a user such as the operator or the like. For example, it would be fine for the network analysis assistance device 10 to normally execute the electronic message association process in regular operation of the equipment management system and to output the results thereof to the display 107, and it would be fine to accomplish only collection of electronic messages during regular operation. In the latter case, when defects and/or the like arise, the electronic message association process is executed in accordance with operation by the operator.

Below, in order to facilitate understanding, the explanation takes as an example a case where an electronic message for control is sent to the equipment 40 from the central monitoring device 20 and the response electronic message to that electronic message returns to the central monitoring device 20.

Figure 7:
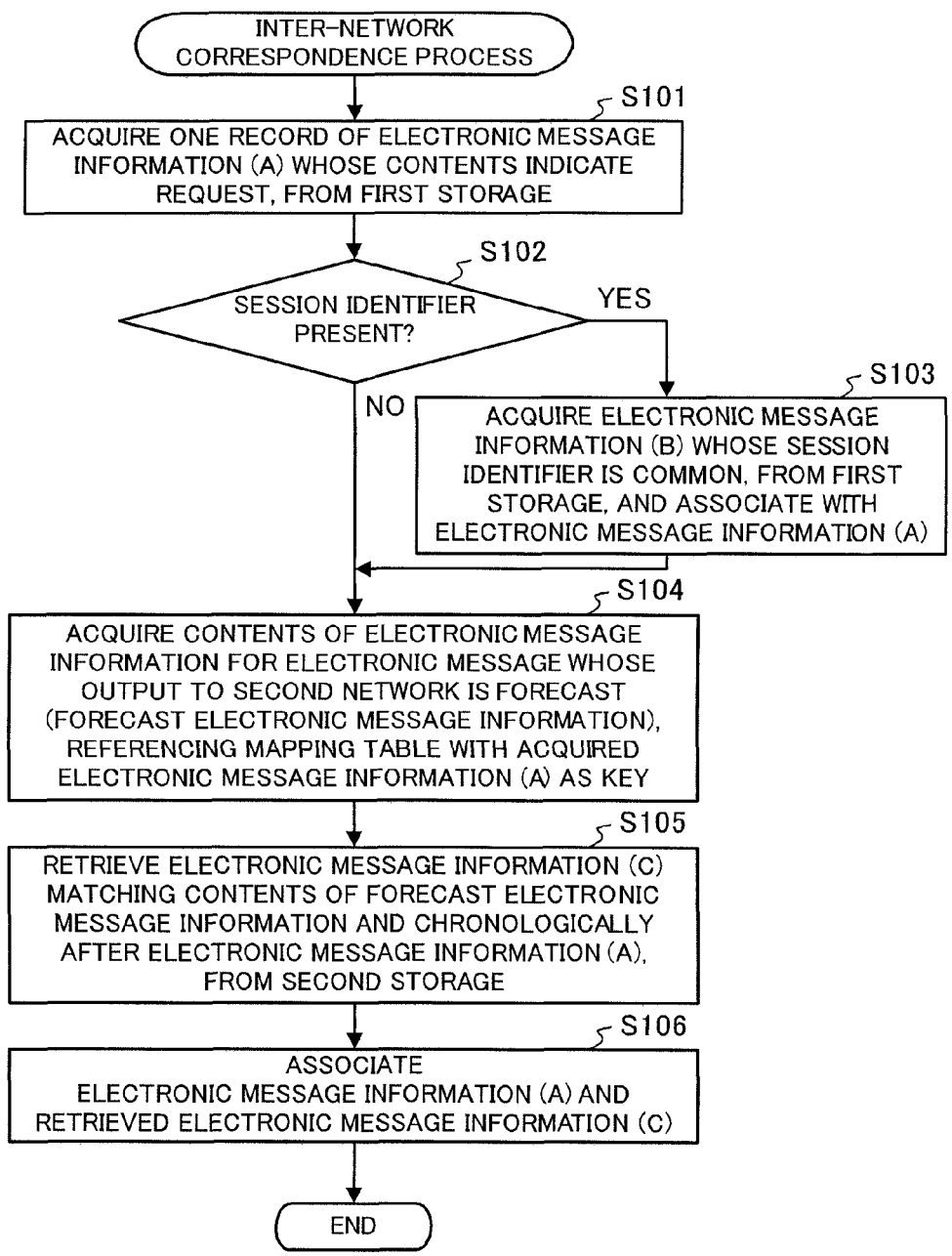
FIG. 7 is a flowchart showing a proceeding of an inter-network correspondence process according to Embodiment 1.

First, the association analyzer 151 accomplishes a process associating electronic messages travelling from the first network 50 to the second network 60, using the mapping table 152. This process (inter-network correspondence process) is described with reference to the flowchart in FIG. 7. First, the association analyzer 151 acquires one record of electronic message information (A) whose contents indicate a request, from the first storage 103 (step S101).

Next, the association analyzer 151 determines whether or not a session identifier is included in the acquired electronic message information (A) (step S102), and when a session identifier is included (step S102: Yes), the association analyzer 151 acquires electronic message information (B) in which the session identifier is common (for example, InvokeID), from the first storage 103 and associates this with the electronic message information (A) (step S103).

When the determination in step S102 is No, after the process in step S103 the association analyzer 151 references the mapping table 152 using the acquired electronic message information (A) as a key, and acquires contents of an electronic message information (forecast electronic message information) of an electronic message forecast to be output from the gateway device 30 to the second network 60 side (step S104). In the example in FIG. 5, when the contents of the acquired electronic message information (A) are "WriteProperty+BO+001", the contents of the corresponding forecast electronic message information (that is to say, that which is forecast to be output to the second network 60 side) becomes "operation+running/stopped."

The association analyzer 151 retrieves electronic message information (C) that matches the contents of the acquired forecast electronic message information and is chronologically after the electronic message information (A), from the second storage 104 (step S105). Furthermore, the association analyzer 151 associates the electronic message information (A) and the retrieved electronic message information (C) (step S106).

Next, the association analyzer 151 accomplishes the process of associating the downward electronic message and the upward electronic message on the second network 60 side, referencing the request-response rules table 153. For example, when the contents of the electronic message information (C) on the second network 60 side associated in the above-described process is "operation+running/stopped" indicating a request, in the example in FIG. 6 the contents of the corresponding electronic message information, that is to say the electronic message information of the electronic message for which a response is forecast to that request, are "operation monitor response+running/stopped."

Accordingly, the association analyzer 151 retrieves an electronic message information (D) that is chronologically later than the electronic message information according to the request and has the contents of "operation monitor response+running/stopped", from the second storage 104. Furthermore, the association analyzer 151 associations the electronic message information (C) according to that request to the retrieved electronic message information (D). When the session identifier has been set, it would be fine to associate electronic message information having a common session identifier.

Next, the association analyzer 151 accomplishes a process of associating electronic message traveling from the second network 60 to the first network 50, using the mapping table 152. In the example in FIG. 5, the "COVNotification+BI+001" on the first network 50 side corresponds to the "operation monitor response+running/stopped" on the second network 60 side. Accordingly, the association analyzer 151 retrieves an electronic message information (E) that is chronologically after the electronic message information (D) of the second network 60 indicating that response and whose contents are "COVNotification+BI+001," from the first storage 103. Furthermore, the association analyzer 151 associates that electronic message information (D) of the second network 60 and the retrieved electronic message information (E) of the first network 50.

Through the above, the associating of a series of electronic messages (electronic message information (A) through (E)) when an electronic message for controlling the equipment 40 is sent from the central monitoring device 20 and a response electronic message to that electronic message returns to the central monitoring device 20 is concluded.

The controller 108 causes the electronic message group (associated electronic message group) associated by the electronic message associator 105 to be displayed on the display 107 along with other associated electronic message groups in an identifiable state, for example color coding and/or the like.

In the above-described electronic message association process, it is possible to arbitrarily set the range of association targets. For example, it would be fine to take only electronic message information related to electronic messages received within a prescribed time from the receipt time of the original electronic message as association targets, and for example, in the process of step S105 of FIG. 7, it would be fine to take only the electronic message information related to the electronic message closest to the receipt time of the original electronic message, from among the electronic message information matching the conditions, as targets of association.

The status analyzer 106 finds the time from input into the gateway device 30 to output, that is to say, the time of the delay by the gateway device 30 (delay time) for the electronic messages associated by the electronic message associator 105. Furthermore, the status analyzer 106 determines whether or not receipt of electronic messages was accomplished normally, based on this delay time.

Here, an electronic message traveling to the gateway device 30 from the first network 50 or the second network 60 is called an input electronic message, and an electronic message travelling from the gateway device 30 to the first network 50 or the second network 60 is called an output electronic message.

With the above-described delay time, a small difference occurs due to type of input and output electronic messages. Here, this is because the process contents of the gateway device 30 differ in accordance with the type of the electronic messages. In addition, even when the same types of electronic messages are input and output, it is conceivable that a different time will result each time in accordance with the processing condition of the gateway device 30 at that time. For example, as a processing condition of the gateway device 30 when the delay becomes larger, for example a state in which other communication processes are accomplished and/or the like and the processing load becomes larger can be assumed. In addition, even circumstances in which operation of the gateway device 30 becomes unstable due to some kind of defect could become the cause of large delays arising.

While the load design and/or the like of the network is accomplished correctly and the network functions normally, it is permissible to think that the delay time fits inside a constant time. However, when some kind of problem occurs, it is generally known that one phenomenon that indicates this problem is that some abnormally lengthy delay times occur. Hence, the network analysis assistance device 10 continuously monitors the delay time for the associated electronic message group, and through this determines whether or not receipt of electronic messages is accomplished normally and detects the absence or presence of abnormalities occurring though these determination results.

Figure 8:
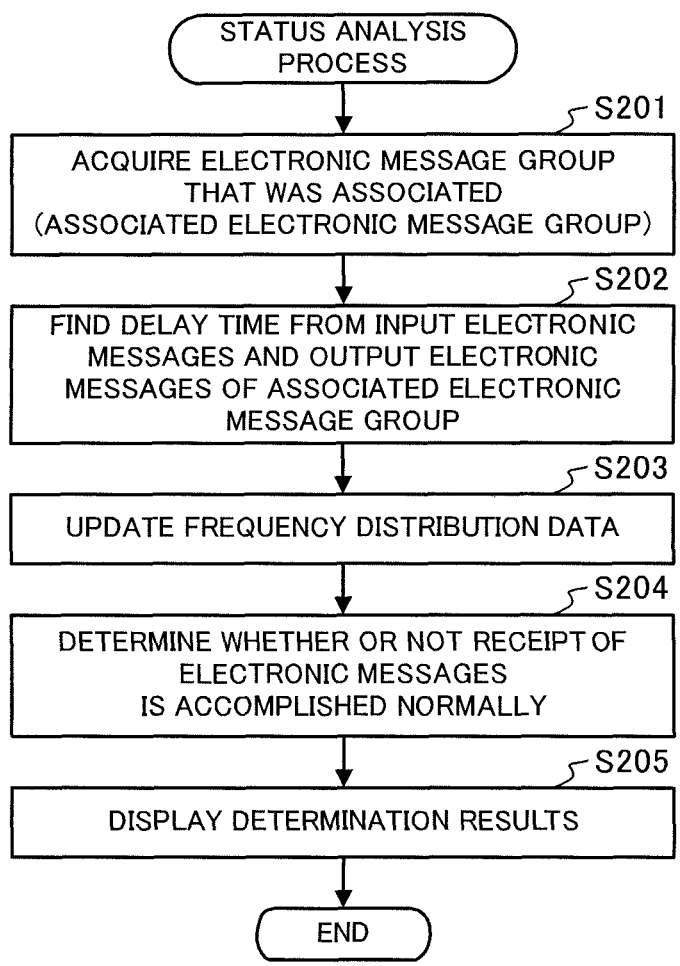
FIG. 8 is a flowchart showing a proceeding of a status analysis process according to Embodiment 1.

FIG. 8 is a flowchart showing a proceeding of a status analysis process executed by the status analyzer 106. This status analysis process is executed after the above-described electronic message association process. The execution timing is arbitrary and it would be fine to start immediately following the electronic message association process or it would be fine to start after a fixed time has elapsed following the electronic message association process. Or, it would be fine for execution to be started in accordance with operation by the operator following the electronic message association process.

First, the status analyzer 106 acquires the electronic message group (associated electronic message group) associated by the electronic message associator 105 (step 201). The associated electronic message group includes associated electronic message information of electronic messages on the first network 50 and electronic messages on the second network 60. The associated electronic messages in some cases are singular and in some cases are multiple for both the first network 50 side and the second network 60 side, but a case where both are single is taken as an example below in order to facilitate understanding.

Figure 9:
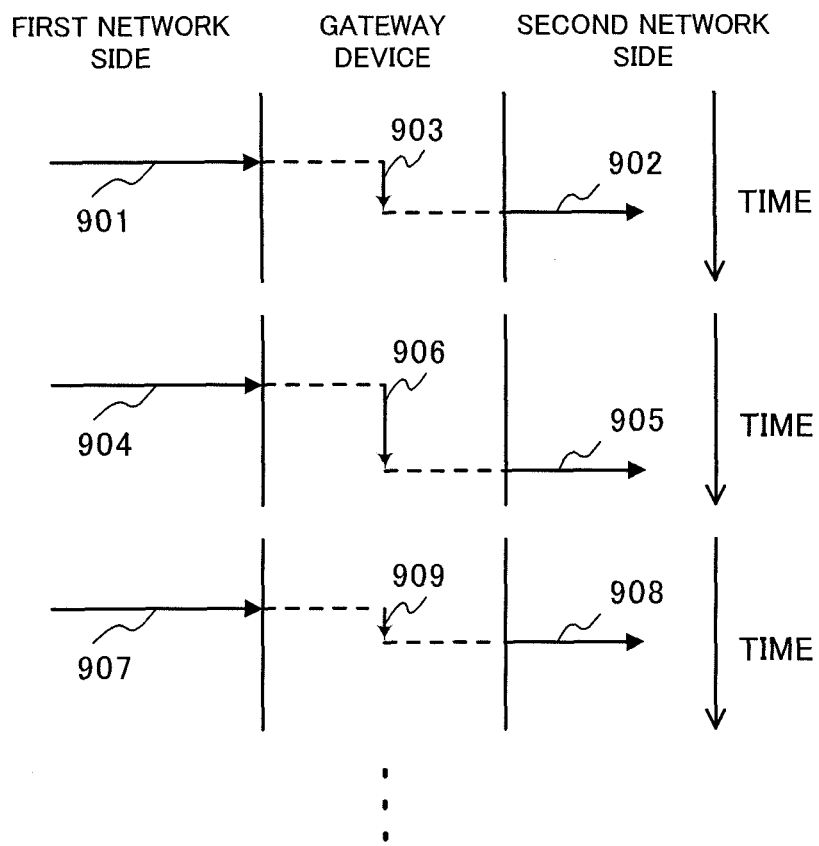
FIG. 9 is a drawing for explaining delay time.

The status analyzer 106 finds the delay time based on the acquisition times for both the input electronic messages and the output electronic messages of the acquired association electronic message group (step S202). For example, the status analyzer 106 finds the time (delay time 903) from when an input electronic message 901 is input into the gateway device 30 to when that electronic message is output as the output electronic message 902, by subtracting the acquisition time of the input electronic message 901 from the acquisition time of the output electronic message 902, as shown in FIG. 9. In the example in FIG. 9, an electronic message traveling from the first network 50 to the gateway device 30 is shown as the input electronic message, and an electronic message travelling from the gateway device 30 to the second network 60 is shown as the output electronic message.

Furthermore, the status analyzer 106 updates frequency distribution data of the delay time using the found delay time (step S203). The frequency distribution data is stored in an undepicted external memory device with which the network analysis assistance device 10 is provided.

In FIG. 9, for example, it is common for the delay time to become different each time, as in the above-described delay time 903, a delay time 906 in the case of an input electronic message 904 and an output electronic message 905, and a delay time 909 in the case of an input electronic message 907 and an output electronic message 908. The status analyzer 106 statistically handles this variance in delay times, and accomplishes automatic determination of abnormalities by deeming cases when a protruding long delay time occurs to be an abnormality.

In this embodiment, delay times are quantified in appropriate levels and classified, and the frequency distribution of the occurrence frequency thereof is found. More specifically, in a system in which delays of several milliseconds occur in normal times, delay times are classified in 1 msec increments. For example, by classifying delay times as there being 20 of 2.5 msec or greater and less than 3.5 msec, 60 of 3.5 msec or greater and less than 4.5 msec and 18 of 4.5 msec or greater and less than 5.5 msec, statistical data (frequency distribution data) such as that shown in FIG. 10 can be constructed.

Figure 10:
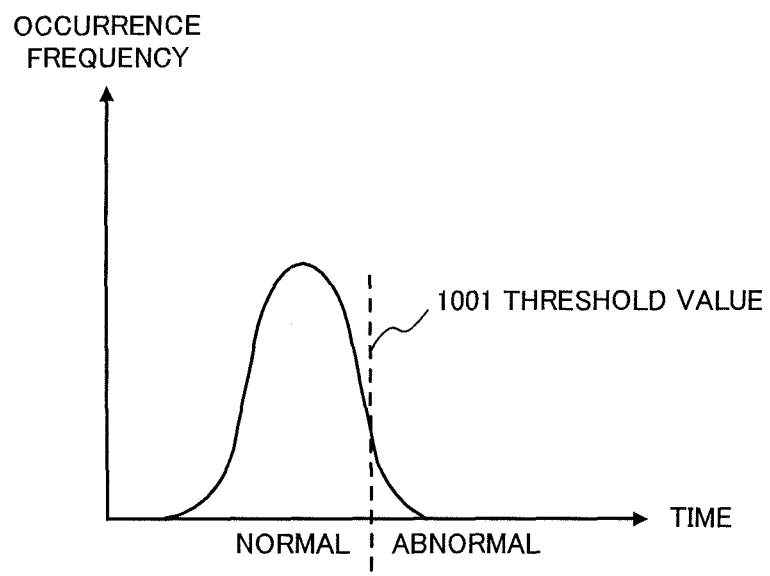
FIG. 10 is a drawing for explaining frequency distribution data.

In FIG. 10, the horizontal axis indicates delay time and the vertical axis indicates the number of times (frequency) each delay time has occurred. A threshold value 1001 is a boundary value determining whether or not a delay time is based on normal electronic message receipt, and in this embodiment fluctuates in conjunction with the frequency distribution. Specifically, the time at which the delay times are at several percent (for example, 3%) of the total from the long side is set as the threshold value 1001. In other examples, it would be fine to define the threshold value 1001 with a constant value in conjunction with the system's design values.

The status analyzer 106 accomplishes a determination of whether or not receipt of the input and output electronic messages is accomplished normally based on the delay times found and the frequency distribution data (step S204). Specifically, when the delay times found are the threshold value 1001 or greater, a determination is made that receipt of the electronic messages is not accomplished normally, and when the delay times found are less than the threshold value 1001, a determination is made that receipt of the electronic messages was accomplished normally. Frequency distribution data that serves as a premade standard is stored in the above-described external memory device prior to the start of operation so as not to pose impediments to the above-described determination process even immediately after the start of operation of the network analysis assistance device 10. Or, it would be fine to fix the set value of the threshold value 1001 until a fixed time has elapsed from the start or operations or until the number of samples of delay times for constructing the frequency distribution data has reached a fixed number.

The status analyzer 106 supplies the above-described determination results to the controller 108. The controller 108 displays the supplied determination results via the display 107 (step S205). When the determination is that receipt of the electronic messages is not accomplished normally, the controller 108 causes the information of the input and output electronic messages to be displayed with emphasis such as color coding on the display 107. Through this, it is possible for the operator to easily recognize the occurrence of an abnormality and the contents of the input and output electronic messages for which abnormalities were detected.

As described above, with the network analysis assistance device 10 according to this embodiment of the present invention, it is possible to associate and exhibit to the operator electronic messages traveling on the first network 50 and the second network 60, so for example when a problem arises, specification of the trouble location or specification of the trouble contents, and/or the like, is easy, thereby making maintenance more efficient.

In addition, from the results of associating electronic messages, it is possible to automatically determine whether or not mutual receipt of the electronic messages between the first network 50 and the second network 60 is accomplished normally, and to exhibit the results thereof to the operator. Through this, it is possible for the operator to easily and reliably recognize the absence or presence of the occurrence of abnormalities in the equipment management system. Furthermore, because the contents of input and output electronic messages for which abnormalities were detected are displayed, specification of the trouble contents and the location where such occurred becomes easier, so that maintenance work becomes more efficient.

The mapping table 152 shown in FIG. 5 and the request-response rules table 153 shown in FIG. 6 show cases in which a one-on-one correlation is defined, but this is but one example. For example, it would be fine for these tables to be defined with one-to-many, many-to-one or many-to-many correlations.

In addition, in the equipment management system, accomplishing control of multiple pieces of equipment through one electronic message is conceivable by the process target class identifiers setting groups of equipment in the process target instance identifiers of the electronic message of BO and BI. For example, when the intent is to create a group number 1 for the process target instance identifier "001," the process target instance identifier is set to "101." By doing this, for example when a number one equipment and a number two equipment belong to the group number 1, it is possible to accomplish running/stopping of the number one equipment and the number two equipment through the electronic message "WriteProperty+BO+101."

Figures 11, 12:
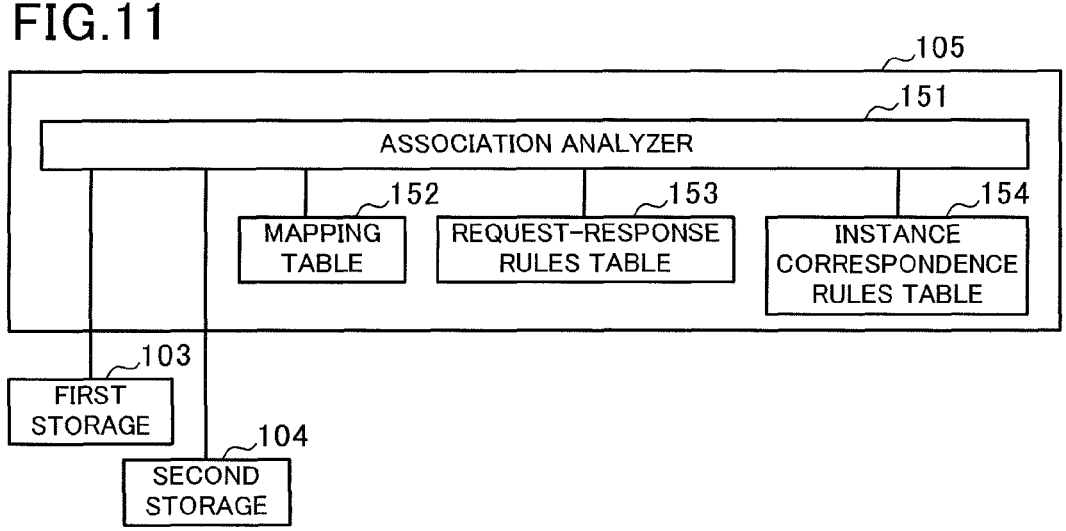
FIG. 11 is a block diagram showing a composition (part 1) of an electronic message associator in a variation of the network analysis assistance device according to Embodiment 1.
FIG. 12 is a drawing showing one example of an instance correspondence rules table in the variation shown in FIG. 11.

In this case as well, it is possible for the electronic message associator 105 to accomplish association of electronic messages by creating an instance correspondence rules table 154 indicating the relationship between the group number and the corresponding pieces of equipment (number one equipment and number two equipment), as shown in FIG. 11 and FIG. 12.

Figure 13:
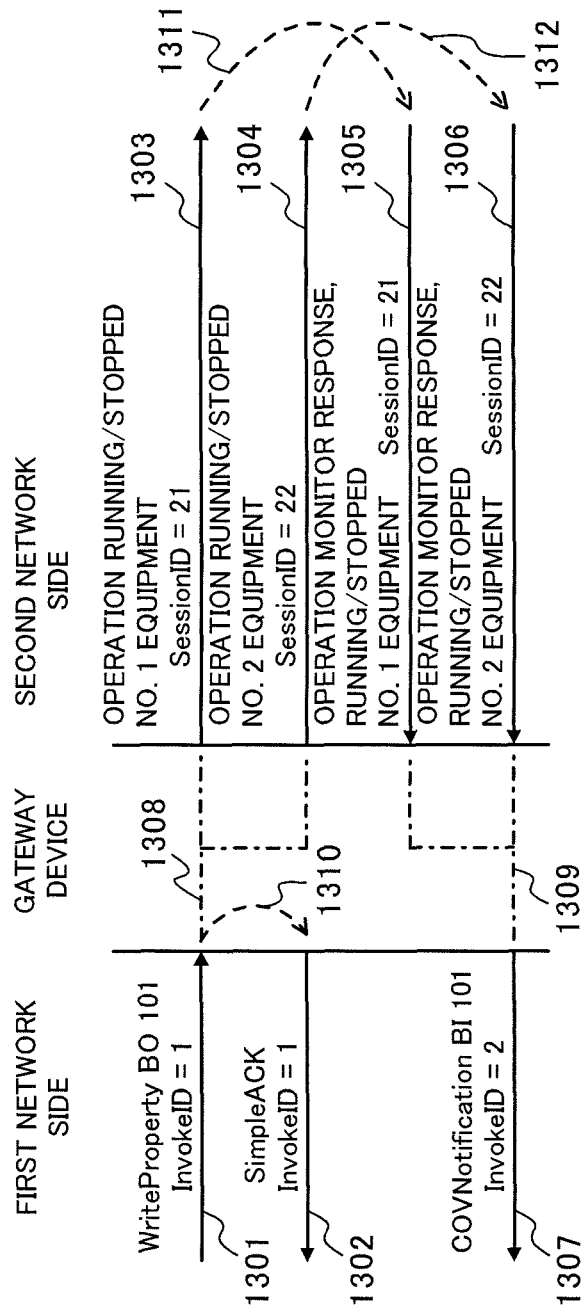
FIG. 13 is a drawing for explaining electronic message association using the instance correspondence rules table in the variation shown in FIG. 11.

Association of electronic messages in this case will be described. In the example of FIG. 13, in the first network 50 side an electronic message 1301 is a downward-direction electronic message with contents of "WriteProperty+BO+101," an electronic message 1302 is an upward-direction electronic message with a command of "SimpleACK", and an electronic message 1307 is an upward-direction electronic message with contents of "COVNotification+BI+101."

In addition, in the second network 60 side, an electronic message 1303 is a downward-direction electronic message indicating "operation+running/stopped" of the number one equipment, an electronic message 1304 is a downward-direction electronic message indicating "operation+running/stopped" of the number two equipment, an electronic message 1305 is an upward-direction electronic message indicating "operation monitor response+running/stopped" from the number one equipment and an electronic message 1306 is an upward-direction electronic message indicating "operation monitor response+running/stopped" from the number two equipment.

In addition, broken lines 1308 and 1309 indicate a correlation established by synthesizing the mapping table 152 and the above-described instance correspondence rules table 154. Dotted-line arrows 1310, 1311 and 1312 indicate correlations found through the session identifiers (InvokeID on the first network 50 side and SessionID on the second network 60 side).

In the above-described cases, first the electronic message associator 105 associates the electronic message 1301 and the electronic message 1302 having a common session identifier (InvokeID) on the first network 50 side. Then, the electronic message 1303 and the electronic message 1304 on the second network 60 side are associated, with reference to the mapping table 152 and the instance correspondence rules table 154. Next, the electronic message 1303 and the electronic message 1305 having a common session identifier (SessionID) are associated, and similarly the electronic message 1304 and the electronic message 1306 having a common session identifier are associated. Even in methods in which the session identifier is not set in the electronic messages on the second network 60 side, it is possible to associate the electronic messages on the second network 60 side by referencing the request-response rules table 153 and the instance correspondence rules table 154.

Furthermore, the electronic message associator 105 associates the electronic message 1305, the electronic message 1306 and the electronic message 1307, referencing the mapping table 152 and the instance correspondence rules table 154. With this, the series of electronic message associations in the example of FIG. 13 concludes.

Figures 14, 15:
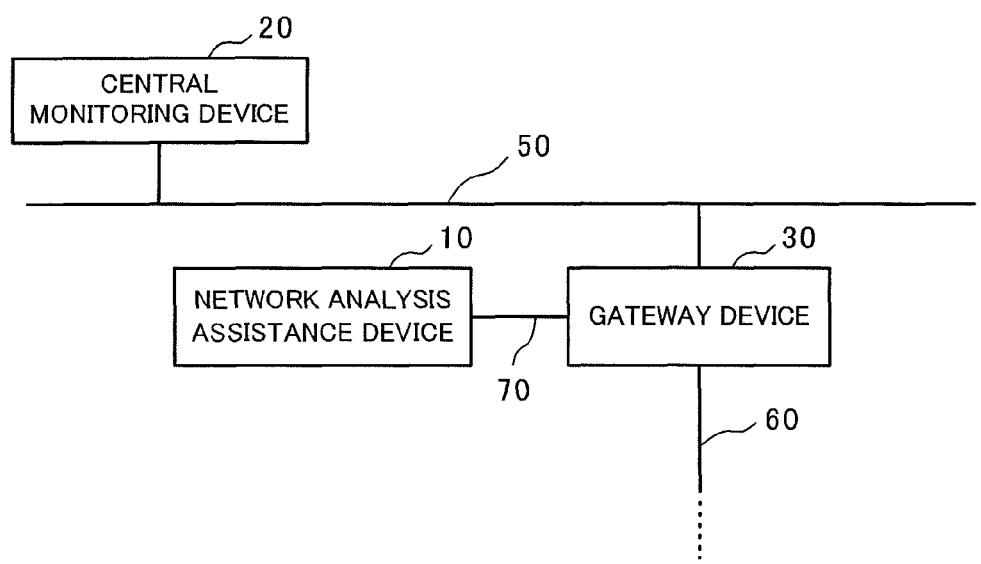
FIG. 14 is a drawing showing another example of the mapping table according to Embodiment 1.
FIG. 15 is a drawing for explaining another example of an electronic message collection method in the network analysis assistance device according to Embodiment 1.

In addition, in the example of the mapping table 152 shown in FIG. 5, the correlation is defined at a relatively detailed level, but as shown in FIG. 14, it would be fine for the definition to be in a slightly larger context.

In addition, as shown in FIG. 15, the network analysis assistance device 10 and the gateway device 30 are connected via a prescribed communication cable 70 so that data communication is possible (it would also be fine to use wireless communications), and it would also be fine to have specifications such that the gateway device 30 transmits to the network analysis assistance device 10 electronic message information according to electronic messages received by the first network 50 side or the second network 60 side, or electronic message information according to electronic messages output to the first network 50 side or the second network 60 side. Or, it would be fine to have specifications such that the above-described composition and a composition in which the network analysis assistance device 10 is connected to the first network 50 or the second network 60 are intermixed.

Figure 16:
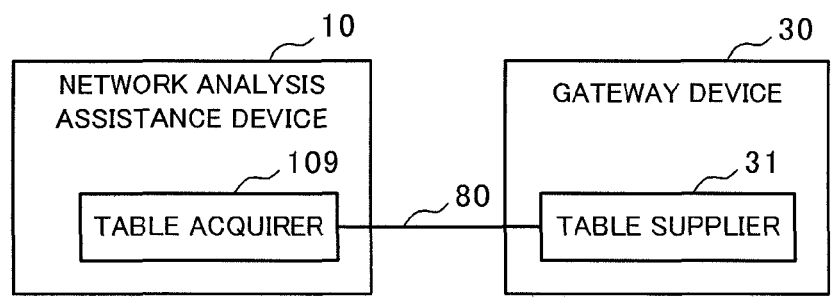
FIG. 16 is a drawing (part 1) for explaining a method of setting up the mapping table, the request-response rules table and the instance correspondence rules table in the network analysis assistance device according to Embodiment 1.

In addition, there are various methods of setting the various tables in the network analysis assistance device 10, such as the mapping table 152, the request-response rules table 153, the instance correspondence rules table 154 and/or the like. For example, as shown in FIG. 16, the network analysis assistance device 10 and the gateway device 30 are connected via a communication cable 80 so that data communication is possible, and it would be fine for the network analysis assistance device 10 to be such that it is possible to acquire the various tables such as the mapping table 152, the request-response rules table 153, the instance correspondence rules table 154 and/or the like from the gateway device 30 through data communication. In this case, as shown in FIG. 16, the network analysis assistance device 10 comprises a table acquirer 109 for acquiring these tables from the gateway device 30, and the gateway device 30 comprises a table supplier 31 for supplying these tables to the network analysis assistance device 10.

Figure 17:
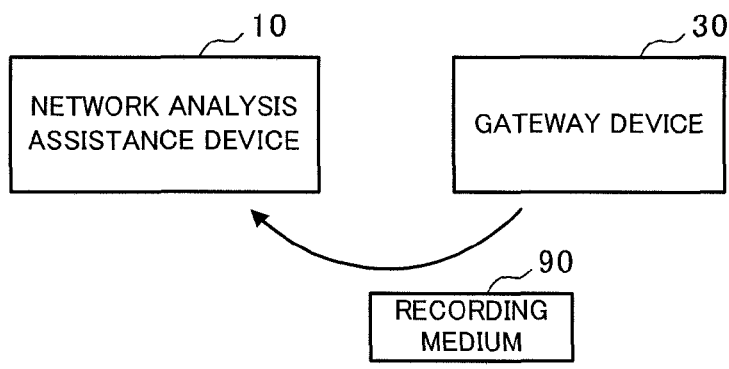
FIG. 17 is a drawing (part 2) for explaining a method of setting up the mapping table, the request-response rules table and the instance correspondence rules table in the network analysis assistance device according to Embodiment 1.

Or, as shown in FIG. 17, it would be fine for the various tables such as the mapping table 152, the request-response rules table 153, the instance correspondence rules table 154 and/or the like to be output to a computer-readable prescribed recording medium 90 on the gateway device 30 side, and for these tables to be read from this recording medium 90 on the network analysis assistance device 10 side and thus be set.

Or, it would be fine for these tables to be input into the network analysis assistance device 10 via a serial interface, a USB (Universal Serial Bus) interface and/or the like from another information processing device and/or the like, or for the user to directly input the contents of these tables into the network analysis assistance device 10 by operating an input device.

Figure 18:
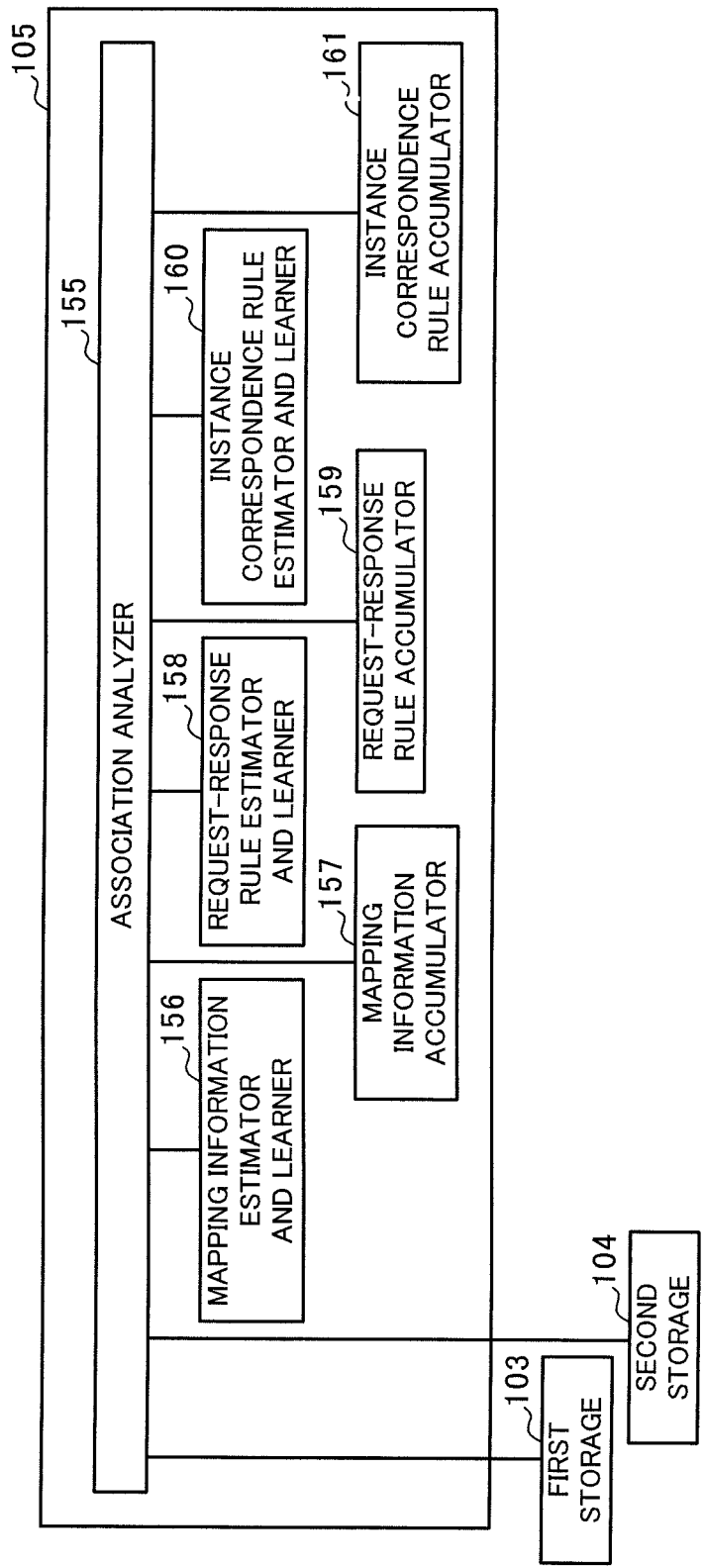
FIG. 18 is a block diagram showing a composition (part 2) of an electronic message associator in a variation of the network analysis assistance device according to Embodiment 1.

Furthermore, it would be fine for information respectively equivalent to the contents of the various tables such as the mapping table 152, the request-response rules table 153, the instance correspondence rules table 154 and/or the like to be created and updated within the network analysis assistance device 10. In this case, as shown in FIG. 18, the electronic message associator 105 comprises an association analyzer 155, a mapping information estimator and learner 156, a mapping information accumulator 157, a request-response rule estimator and learner 158, a request-response rule accumulator 159, an instance correspondence rule estimator and learner 160 and an instance correspondence rule accumulator 161.

The electronic message associator 105 of the above-described composition is such that the association analyzer 155 acquires electronic message information from the first storage 103 and the second storage 104, the correlation of electronic messages is estimated and learned using the mapping information estimator and learner 156, the request-response rule estimator and learner 158 and the instance correspondence rule estimator and learner 160, and the results are respectively stored in the mapping information accumulator 157, the request-response rule accumulator 159 and the instance correspondence rule accumulator 161.

It would be fine for initial values of simple contents (for example, information at the level shown in FIG. 14) to be respectively set in the mapping information accumulator 157, the request-response rule accumulator 159 and the instance correspondence rule accumulator 161.

Figure 19:
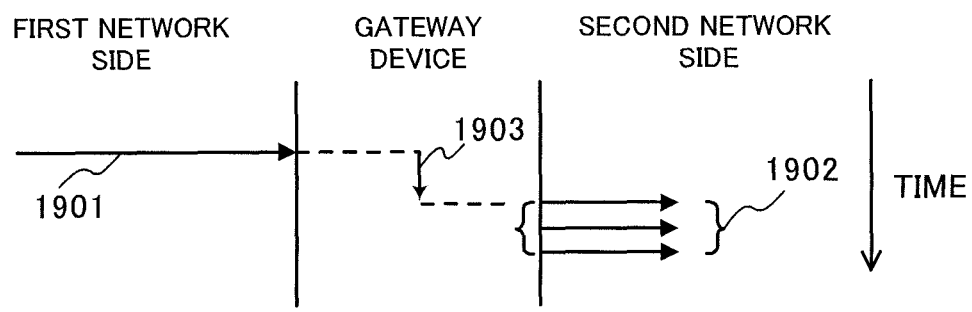
FIG. 19 is a drawing (part 1) for explaining a function of the network analysis assistance device shown in FIG. 18.

Below, the method of estimating the mapping information and/or the like is described simply. For example, when a single request electronic message 1901 on the first network 50 side such as that shown in FIG. 19 and an electronic message 1902 on the second network 60 side travelling at that time are detected, it is natural to think that there is an association between these, so the mapping information estimator and learner 156 and/or the like accomplishes a process that reflects the correlation between these in the estimation results of the mapping information. In addition, at that time it would be fine to take into account the tendency of a delay time 1903 to output with respect to input. In addition, the correlation of the electronic message information to the constituent elements as a whole may be reflected, or a portion of the constituent elements may be used.

It is possible to determine whether or not there is a single electronic message based on whether or not other electronic messages are detected within a prescribed time before and after detection of that electronic message. Even when this is not a single electronic message, for example when electronic messages of the same quality (for example, electronic messages in which the command and process target class identifiers are common and the process target instance identifier alone is different, and/or the like) consecutively appear on the first network 50 side, there is a strong possibility of it being possible to grasp the associated tendency by investigating the electronic message group that appeared on the second network 60 side at that time.

Figure 20:
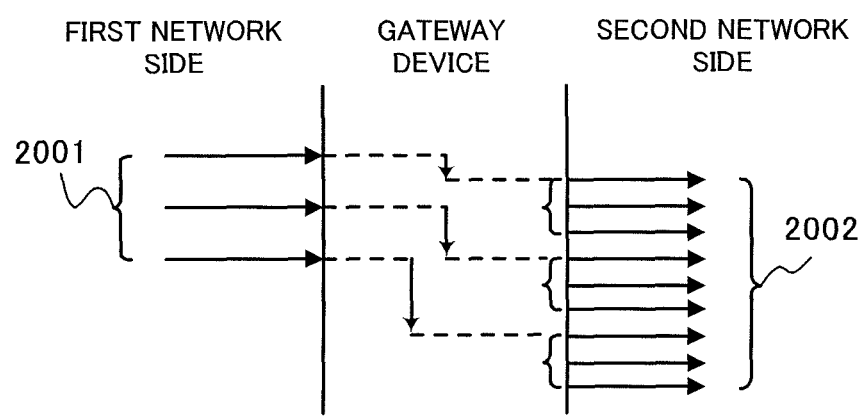
FIG. 20 is a drawing (part 2) for explaining a function of the network analysis assistance device shown in FIG. 18.

In addition, as shown in FIG. 20 for example, the mapping information estimator and learner 156 and/or the like is such that when nine electronic messages 2002 in the downward direction are detected on the second network 60 side when three electronic messages 2001 in the downward direction are detected on the first network 50 side, if the command in each of the electronic messages 2002 is common, it is possible to estimate that three of the electronic messages 2002 are associated with each one electronic message in the electronic messages 2001. Furthermore, the mapping information estimator and learner 156 and/or the like is such that it is possible to accomplish a process that causes the estimation results to be reflected in the estimation and learning results of the mapping information and/or the like.

As described above, by pursing estimation and learning, it is possible to construct information suitable for the contents of each table out of the mapping table 152, the request-response rules table 153 and the instance correspondence rules table 154 and/or the like within the network analysis assistance device 10 by estimating and learning the mapping information, request-response rules and instance correspondence rules and/or the like.

Figure 21A:
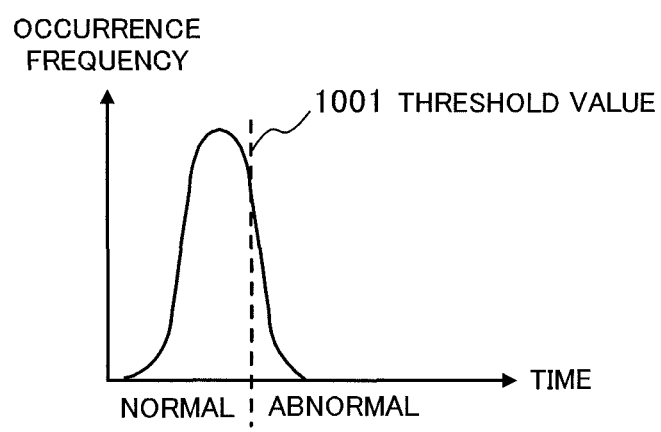
FIG. 21A is a drawing (part 1) for explaining an example of a threshold value being set by a function for learning in accordance with frequency distribution, in a variation of the network analysis assistance device according to Embodiment 1.
Figure 21B:
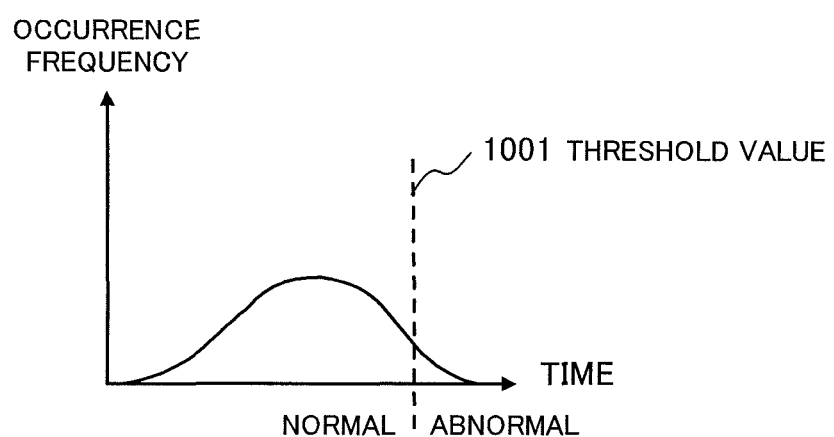
FIG. 21B is a drawing (part 2) for explaining an example of a threshold value being set by a function for learning in accordance with frequency distribution, in a variation of the network analysis assistance device according to Embodiment 1.

In addition, in the status analysis process, it would be fine for the specifications to be such that the threshold value 1001 used in determining whether or not the delay time is based on normal electronic message receipt is set through a function that learns in accordance with frequency distribution. For example, when the frequency distribution has a narrow distribution width, such as that shown in FIG. 21A, that is to say indicates a tendency for little variance, in this equipment management system it could be said that the processing capacity of the gateway device 30 and/or the like is high and more strict determination criteria are sought. Consequently, it would be fine for the threshold value 1001 in this case to be set to a smaller value than normal (a shorter time than normal) through the function of learning in accordance with frequency distribution. In addition, conversely when the frequency distribution has a wide distribution width, such as that shown in FIG. 21B, that is to say indicates a tendency for large variation, it would be fine to set the threshold value 1001 to a larger value than normal (a longer time than normal).

In addition, it would be fine to update the frequency distribution data after determination of whether or not receipt of electronic messages is accomplished normally.

In addition, the above-described frequency distribution data may be individually constructed by classifying, as keys, a portion of the electronic message information, for example, each destination address (each piece of equipment (1)), each command (each process content), each process target class identifier+process target instance identifier (each equipment (2)), each process target class identifier+process target property identifier (each monitoring and operation target attribute of the equipment), and/or the like. Or, it would be fine to classify electronic messages directed to the second network 60 side from the first network 50 side, or the reverse. Furthermore, it would be fine to make classifications by appropriately combining and/or the like these conditions.

In addition, because cases of error responses differ from cases where processing contents are normal, it would be fine for the delay time according to electronic messages showing error responses to be tabulated separately.

In addition, as described above, besides the electronic message association results and the determination results of whether or not receipt of electronic messages is normal, it is also possible for the network analysis assistance device 10 to detect various conditions according to that equipment management system and to display those results. For example, by finding the change in the shape of the delay time distribution and change in the overall tendency of the delay time (shifting more to the slow direction than normal overall, and/or the like), it is possible to detect change (good or bad condition) in the status of the gateway device 30 and other equipment and/or the like comprising the equipment management system or change in the increase or decrease of equipment and/or the like, and to display this and thus exhibit such to a user such as the operator and/or the like.

Embodiment 2

Next, Embodiment 2 of the present invention is described. In the below description, constituent parts and/or the like that are common with Embodiment 1 are labeled with the same reference signs and explanation of such is omitted.

FIG. 22 is a drawing showing an overall composition of an equipment management system that is the target of test by a network test device 200 according to Embodiment 2 of the present invention. This equipment management system is a building management system similar to Embodiment 1, and as shown in FIG. 22 comprises a central monitoring device 20, a gateway device 30 and multiple pieces of equipment 40A to 40F. The equipment 40A to 40F are grouped by prescribed conditions (for example, each type of equipment). In this example, the equipment 40A and 40B belong to a group 1, and the equipment 40C to 40F belong to a group 2.

When monitoring and/or the like of the operation or action status of each piece of equipment 40 is accomplished by the central monitoring device 20, the prescribed electronic messages are output to the first network 50 from the central monitoring device 20. The electronic messages, after being converted by the gateway device 30 into a data format processable by the various pieces of equipment 40, are output to the second network 60 side and arrive at the various pieces of equipment 40. On the other hand, electronic messages from the various pieces of equipment 40, after being converted by the gateway device 30 into a data format processable by the central monitoring device 20, are output to the first network 50 and arrive at the central monitoring device 20.

A network test device 200 according to this embodiment is a device for accomplishing communication test between the first network 50 and the second network 60, in other words is a device for accomplishing an test to confirm whether or not the gateway device 30 is operating normally. During the test, the network test device 200 is connected to both the first network 50 and the second network 60 as shown in the drawings.

In terms of hardware, the network test device 200 comprises a CPU, a ROM, a RAM, an external memory device (for example, comprising readable and writeable non-volatile semiconductor memory, a hard disk drive and/or the like), an input device (for example, comprising a keyboard, a mouse, a keypad, a touch pad, a touch panel and/or the like), a display device (for example, comprising a CRT, an LCD monitor or the like) and a prescribed communication interface and/or the like, although none of these is depicted in the drawings. Each process (described in detail below) executed by the network test device 200 is realized by the CPU and/or the like executing prescribed programs stored in the ROM or the external memory device.

Figure 23:
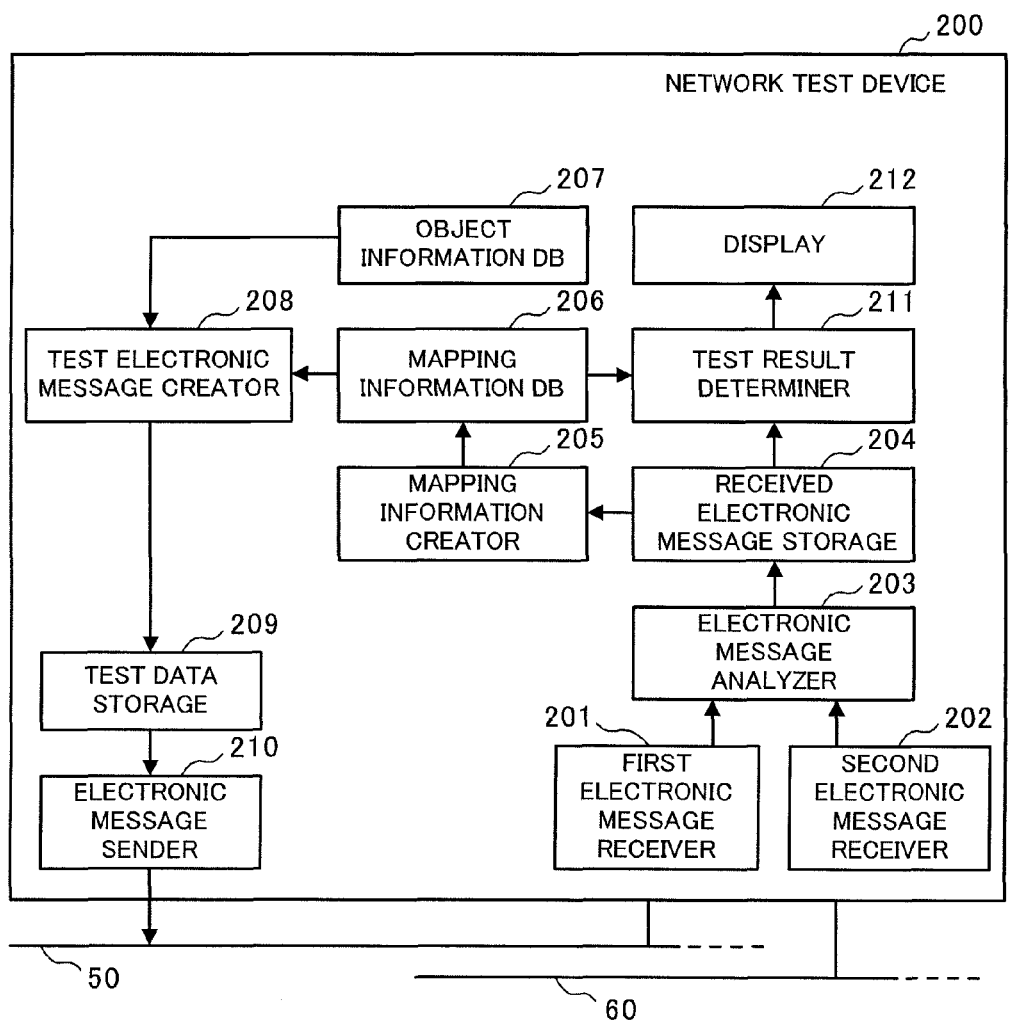
FIG. 23 is a block diagram showing a composition of the network test device shown in FIG. 22.

The network test device 200 functionally comprises a first electronic message receiver 201, a second electronic message receiver 202, an electronic message analyzer 203, a received electronic message storage 204, a mapping information creator 205, a mapping information DB 206, an object information DB 207, an test electronic message creator 208, an test data storage 209, an electronic message sender 210, a test result determiner 211 and a display 212, as shown in FIG. 23.

The first electronic message receiver 201 receives electronic messages travelling on the first network 50 and supplies the received electronic messages to the electronic message analyzer 203. The second electronic message receiver 201 receives electronic messages travelling on the second network 60 and supplies the received electronic messages to the electronic message analyzer 203.

The electronic message analyzer 203 analyzes the electronic messages supplied respectively from the first electronic message receiver 201 and the second electronic message receiver 202 and extracts necessary information. Furthermore, the electronic message analyzer 203 creates information (electronic message information) appending the reception date and time and/or the like to the extracted information and stores the result in the received electronic message storage 204.

The mapping information creator 205 reads electronic message information stored in the received electronic message storage 204 and estimates the correlation between the electronic messages input into the gateway device 30 from the first network 50 side (hereafter called the input electronic messages) and the electronic messages output from the gateway device 30 to the second network 60 side (hereafter called the output electronic messages). Furthermore, the mapping information creator 205 records the information that obtained the estimated results (mapping information) in the mapping information DB 206. The specific method of estimation accomplished by the mapping information creator 205 is described below.

Figures 24, 25:
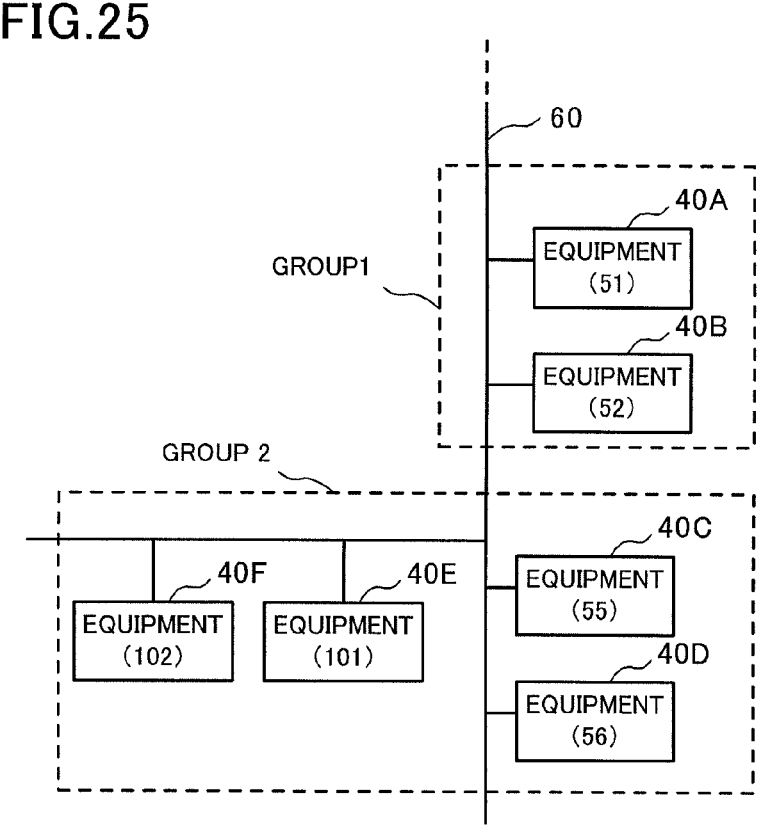
FIG. 24 is a drawing showing an example of mapping information recorded in a mapping information database shown in FIG. 23.
FIG. 25 is a drawing showing values of equipment addresses assigned to various equipment in Embodiment 2.

The mapping information DB 206 is a database in which mapping information defined using all or a portion of the constituent elements of an electronic message for the correlation between the input electronic messages and the output electronic messages is recorded. FIG. 24 shows an example of mapping information recorded in the mapping information DB 206. In this example, the correlation between the contents of an object contained in the input electronic messages and a command classification and equipment addresses contained in the output electronic messages is defined. In this embodiment, the object is indicated by object classification (also called class ID) (for example, "BO")+instance ID (for example, "0101").

An equipment address is an address for communication assigned to each piece of equipment 40. FIG. 25 shows the equipment address of each piece of equipment 40 in this embodiment.

Returning to FIG. 23, the object information DB 207 is a database that correlates, in levels, properties and property values to each of all or a portion of the objects managed by the gateway device 30. There are various methods of inputting information recorded in the object information DB 207, and a number of examples are described below.

The test electronic message creator 208 creates electronic messages for test with reference to the mapping information DB 206 and the object information DB 207. Procedures for doing so are explained below.

The test electronic message creator 208 reads one object of the input electronic messages from the mapping information DB 206. Then, one or multiple properties used in creating test electronic messages are selected from the multiple properties corresponding to that object, with reference to the object information DB 207. The method of selecting properties is an arbitrary design item. For example, in an electronic message for an object having a present value property (Present_Value), normally the possibility that this property is used is extremely high, so it is preferable that this be selected as a property for use in creating test electronic messages.

Similarly, in an electronic message for an object having an upper/lower limit property and a maximum/minimum value property, normally there is a high possibility that these properties will be used, so selection is desirable.

Next, the test electronic message creator 208 acquires the corresponding property value for each selected property, referencing the object information DB 207. Furthermore, the property value set in the electronic messages is determined based on the acquired property value. For example, the present value property of the object "B001" indicating the running/stopped setting has two property values (0: stop; 1: operate). Accordingly, in this case the test electronic message creator 208 creates two test electronic messages with the respective settings "0" and "1" as property values. In addition, the test electronic message creator 208, in addition to this kind of normal electronic messages in which normal values are set, creates abnormal electronic messages in which an abnormal value (for example, "2" and/or the like) is set.

Similarly, in the case of the upper/lower limit property and/or the like, in addition to normal electronic messages in which values within the range are set, abnormal electronic messages with a value outside the range set are created. For example, when the property value obtained with reference to the object information DB 207 is upper limit value: 10, lower limit value: 5, a value of 5-10 is set in the normal electronic messages and a value of 11 or greater or 4 or less is set in the abnormal electronic messages.

The test electronic message creator 208 in this manner creates one or multiple test electronic messages corresponding to a single object. Furthermore, the same process is accomplished for all objects recorded in the mapping information DB 206, and one or multiple test electronic messages corresponding respectively to these are created.

The test electronic message creator 208 stores test data with multiple test electronic messages created in the above manner as a set in the test data storage 209. In the test data storage 209, besides the above-described test data created by the test electronic message creator 208, data composed from electronic message sets for constructing the mapping information DB 206 (mapping information creation data) is stored in advance.

The electronic message sender 210 reads the mapping information creation data from the test data storage 209 in the process of creating the mapping information (mapping information creation process), and successively outputs electronic messages set therein to the first network 50 at prescribed time intervals.

In addition, the electronic message sender 210 reads test data from the test data storage 209 in the process of executing test (test execution process), and successively outputs the test electronic messages set therein to the first network 50 at prescribed time intervals.

The test result determiner 211, at the time of the test execution process, reads the electronic message information stored in the received electronic message storage 204 at prescribed time intervals and accomplishes determination of whether or not the test results are normal, with reference to the mapping information DB 206. That is to say, whether or not the relationship between one input electronic message and one or multiple output electronic messages is correct is determined with reference to the mapping information DB 206. When the input electronic message is an above-described abnormal electronic message, and when an output electronic message corresponding to that input electronic message cannot be detected, the test result is determined to be normal, and when such is not the case, the test result is determined to be abnormal. The test result determiner 211 supplies information including the input electronic message that was the determination target, output electronic messages corresponding thereto and the determination results to the display 212.

The display 212 displays the above-described information supplied from the test result determiner 211 in a prescribed format. At this time, it is fine to display these contents with emphasis in order to make viewing of the input electronic message determined to be abnormal and output electronic messages corresponding thereto easier for the operator to visually confirm.

Next, the various processes executed in the network test device 200 comprised as described above are explained in detail.

Figure 26:
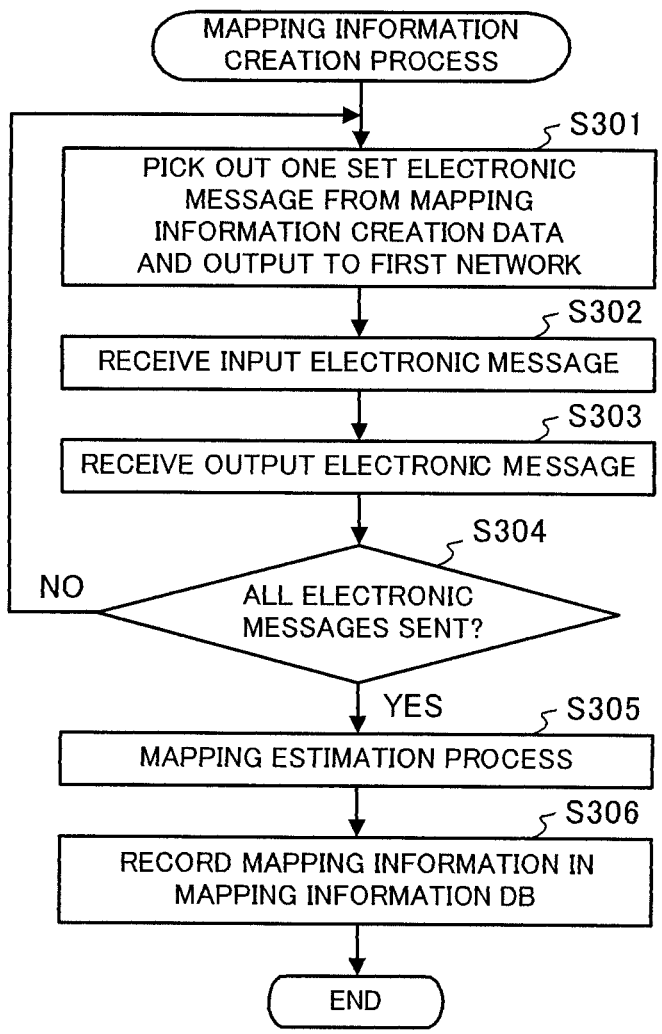
FIG. 26 is a flowchart showing a proceeding of a mapping information creation process of Embodiment 2.

FIG. 26 is a flowchart showing a proceeding of a mapping information creation process. When a prescribed operation is accomplished by the operator via an undepicted input device of the network test device 200, execution of the mapping information creation process is started by the CPU and/or the like.

First, the electronic message sender 210 reads mapping information creation data from the test data storage 209. Then, the electronic message sender 210 picks out one electronic message set in the mapping information creation data and outputs this to the first network 50 (step S301).

The first electronic message receiver 201 receives the electronic message output to the first network 50, that is to say the input electronic message (step S302). In addition, the second electronic message receiver 202 receives electronic messages output to the second network 60 from the gateway device 30, that is to say the output electronic message (step S303). The electronic messages respectively received by the first electronic message receiver 201 and the second electronic message receiver 202 are supplied to the electronic message analyzer 203. The electronic message analyzer 203 extracts necessary information from the supplied electronic messages, creates electronic message information by appending reception date and time thereto, and stores the result in the received electronic message storage 204.

When all of the electronic messages set in the mapping information creation data have been sent (step S304: Yes), the electronic message sender 210 makes notification of this to the mapping information creator 205. On the other hand, when all of the electronic messages set in the mapping information creation data have not been sent (step S304: No), the electronic message sender 210 again executes the process of step S301 after a prescribed time has elapsed.

The mapping information creator 205 upon receiving the above-described notification from the electronic message sender 210 reads the electronic message information stored in the received electronic message storage 204 and accomplishes the process of estimating the correlation between input electronic messages and output electronic messages (mapping estimation process) (step S305).

Below, the method of estimation in this mapping estimation process is described by citing a concrete example. First, the mapping information creator 205 picks out one electronic message information for an input electronic message from the received electronic message storage 204. Then, after the input electronic message is input to the gateway device 30, the electronic message information for output electronic messages output from the gateway device 30 within a prescribed time is all picked out from the received electronic message storage 204 and correlated to that input electronic message. This is accomplished for all input electronic messages.

Figure 27:
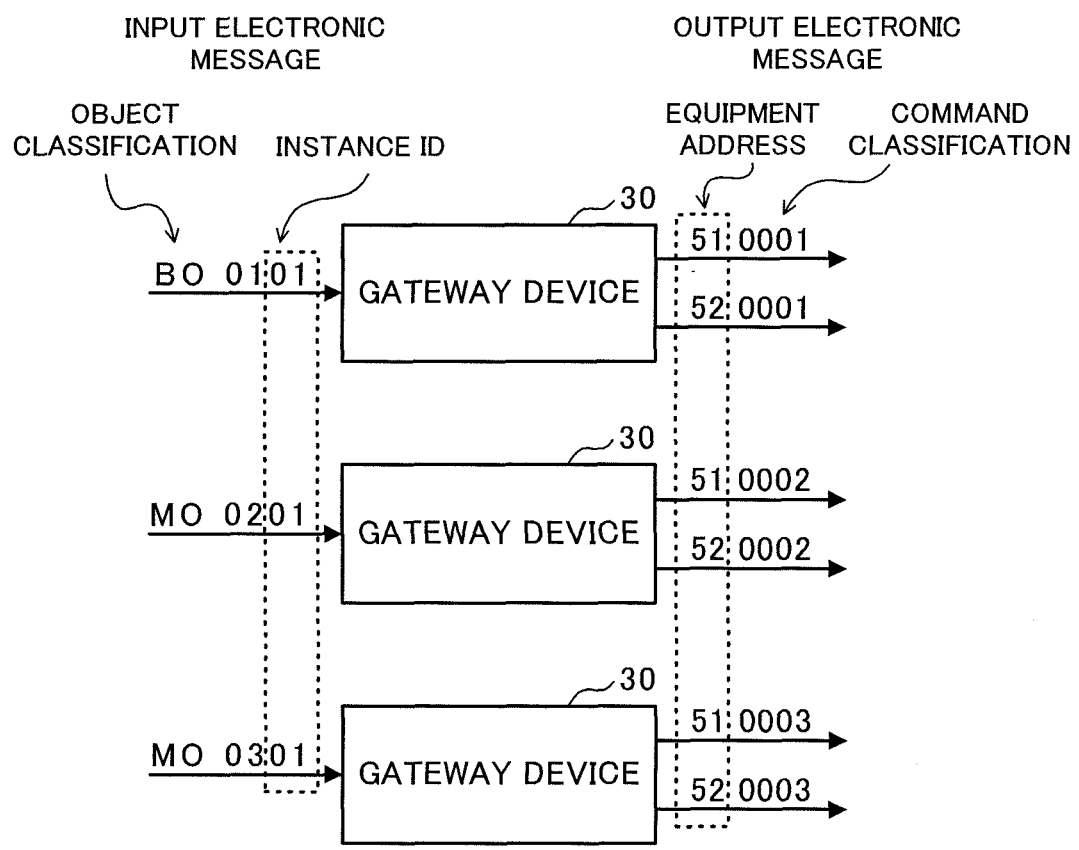
FIG. 27 is a drawing (part 1) for explaining a mapping estimation process of Embodiment 2.

When a set of input/output electronic messages is obtained as described above, the mapping information creator 205 from among those picks up a set of input/output electronic messages in which the equipment address group is common, as shown in FIG. 27, for example. Furthermore, detection of the common points is accomplished focusing on the objects in the set of input/output electronic messages thus picked up. In the example in FIG. 27, it can be seen that the last two digits of the instance ID of each object is common. Through this, it can be seen that the last two digits of the instance ID indicates the address group of the equipment 40 that is the control target. In this example, the last two digits "01" of the instance ID corresponds to the equipment addresses "51" and "52".

It is possible to detect the common points of the objects for example by lining up the objects in a prescribed order (chronological order and/or the like) and finding the difference between neighboring objects. In this case, the two objects are divided into the three parts of "object classification," "first two digits of the instance ID" and "last two digits of the instance ID", and the difference of each is found. For example, if the object is "BO0101", the object is divided into the three parts of "BO", "01" and "01", and if the object is "MO0201", the object is divided into the three parts of "MO", "02" and "01".

In the above-described case, when the difference is found in each part of the two objects, the part of the last two digits of the instance ID becomes 0. Furthermore, as a result of the difference being similarly taken for all neighboring objects, if the part that is the last two digits of the instance ID becomes 0, it is possible to consider the last two digits of the instance ID to be common.

Figure 28:
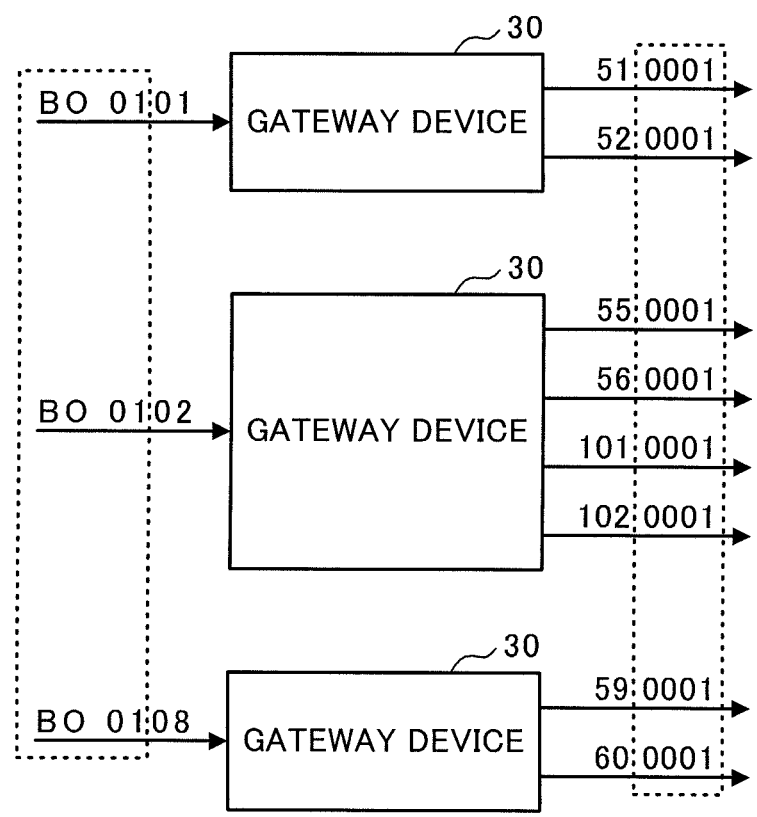
FIG. 28 is a drawing (part 2) for explaining a mapping estimation process of Embodiment 2.

In addition, in another example, the mapping information creator 205 picks up a set of input/output electronic messages with a common command classification, for example as shown in FIG. 28, from among the set of input/output electronic messages initially correlated. Furthermore, detection of the common points is accomplished focusing on the objects of the input/output electronic message set thus picked up. In this case, similar to the above, it is possible to detect the common points by arranging the objects in a prescribed order and taking the difference between neighboring objects. In this case, the mapping information creator 205 divides the two objects into the two parts of "object classification+instance ID first two digits" and "instance ID last two digits", and takes the difference of each.

Whereupon, in the example in FIG. 28, in the differences of all neighboring objects, the part that is "object classification+instance ID first two digits" becomes 0. Accordingly, it is understood that this part of each object is a common point. Through this, it is established that the "object classification+instance ID first two digits" indicates the command classification for the equipment 40.

Figure 29:
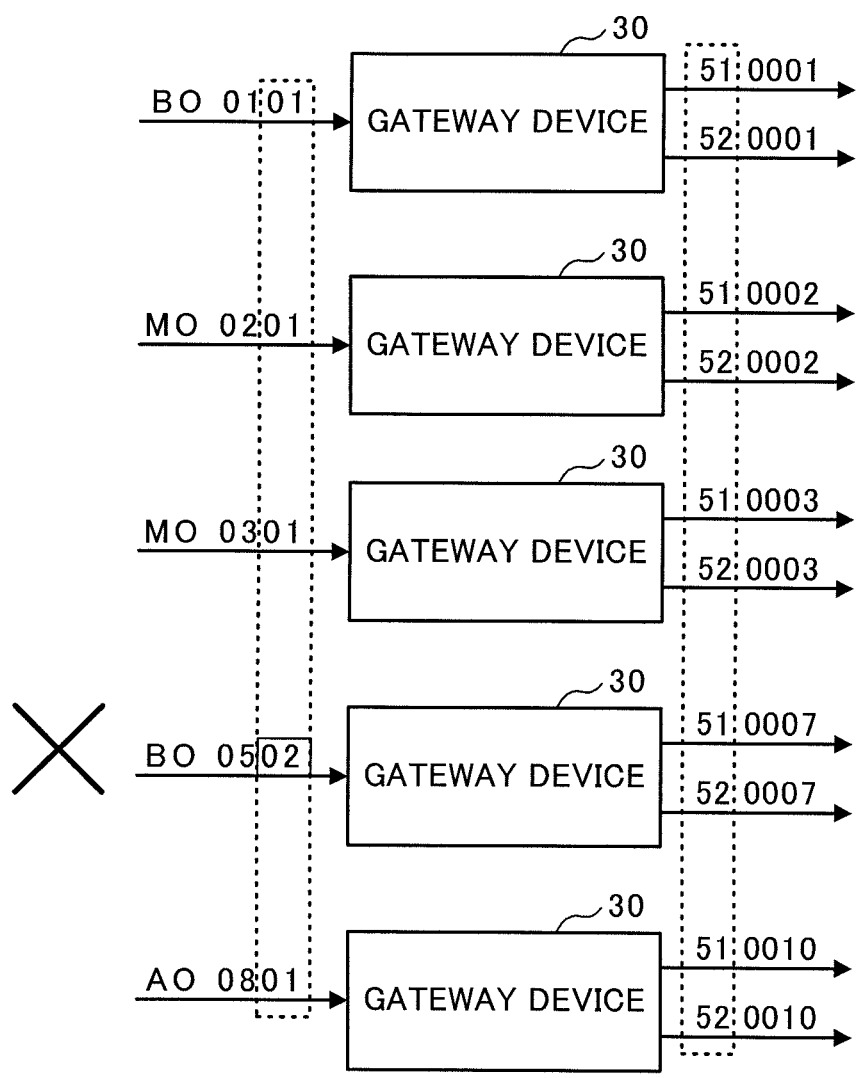
FIG. 29 is a drawing (part 3) for explaining a mapping estimation process of Embodiment 2.

In the above-described manner, when the common points of objects are detected, cases in which sets of input/output electronic messages in which no common points with other objects can be discovered are mixed in are conceivable, as shown in FIG. 29. When the occurrence ratio of such sets of input/output electronic messages is extremely low and/or the like, it is preferable to exclude such as irregular. Accordingly, when the number of sets of input/output electronic messages in which common points were discovered as a percentage of the total number of sets of input/output electronic messages that are targets of detecting common points is a preset threshold value or greater, it would be fine to handle those common points as correct.

The mapping information creator 205 estimates the correlation between the input electronic message and the output electronic message as described above. Furthermore, the information obtained as a result of that estimation (mapping information) is recorded in the mapping information DB 206 (step S306). Through this, the mapping information DB 206 is constructed.

Figure 30:
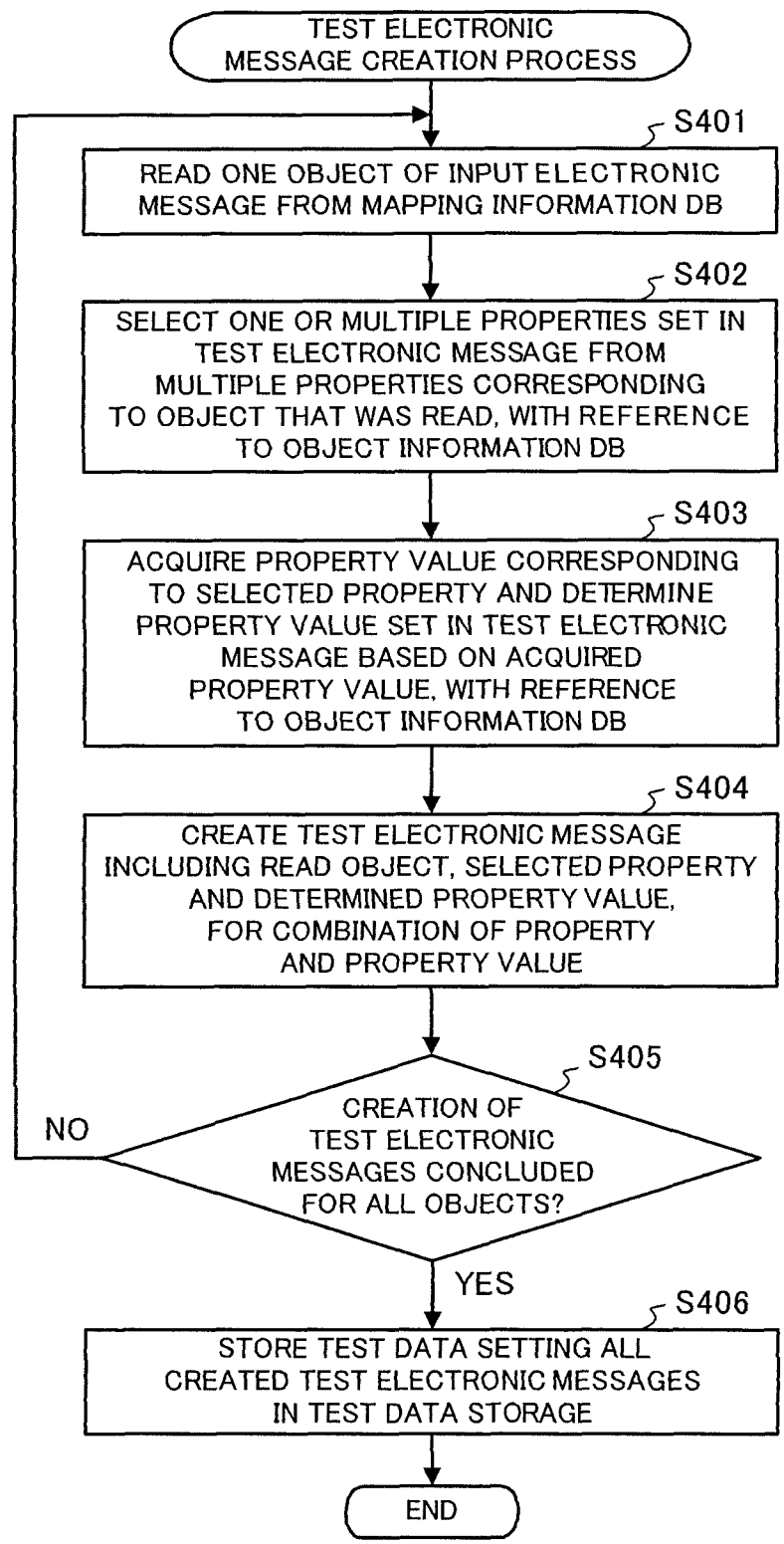
FIG. 30 is a flowchart showing a proceeding of a test electronic message creation process of Embodiment 2.

Next, a test electronic message creation process is explained with reference to the flowchart in FIG. 30. This process is started by a prescribed operation being accomplished by the operator after the mapping information DB 206 is constructed. Or, it would be fine for the process to start automatically following the conclusion of the above-described mapping information creation process.

First, the test electronic message creator 208 reads one object of the input electronic messages from the mapping information DB 206 (step S401). Then, one or multiple properties set in the test electronic message are selected as described above from among the multiple properties corresponding to that object, with reference to the object information DB 207 (step S402). Next, the test electronic message creator 208 acquires a corresponding property value for each selected property by referencing the object information DB 207. Then, the property value set in the test electronic message is determined as described above based on the acquired property value (step S403).

The test electronic message creator 208 creates an test electronic message including the object, the selected property and the determined property value, for the combination of property and property value (step S404). At this time, the test electronic message creator 208 stores in the header and/or the like of the various test electronic messages information indicating either a normal electronic message or an abnormal electronic message.

When creation of test electronic messages for all objects recorded in the mapping information DB 206 has concluded (step S405: Yes), the test electronic message creator 208 stores test data, in which all test electronic messages created are set, in the test data storage 209 (step S406). On the other hand, when creation of test electronic messages has not been concluded for all objects recorded in the mapping information DB 206 (step S405: No), the test electronic message creator 208 again executes the process in step S401.

Figure 31:
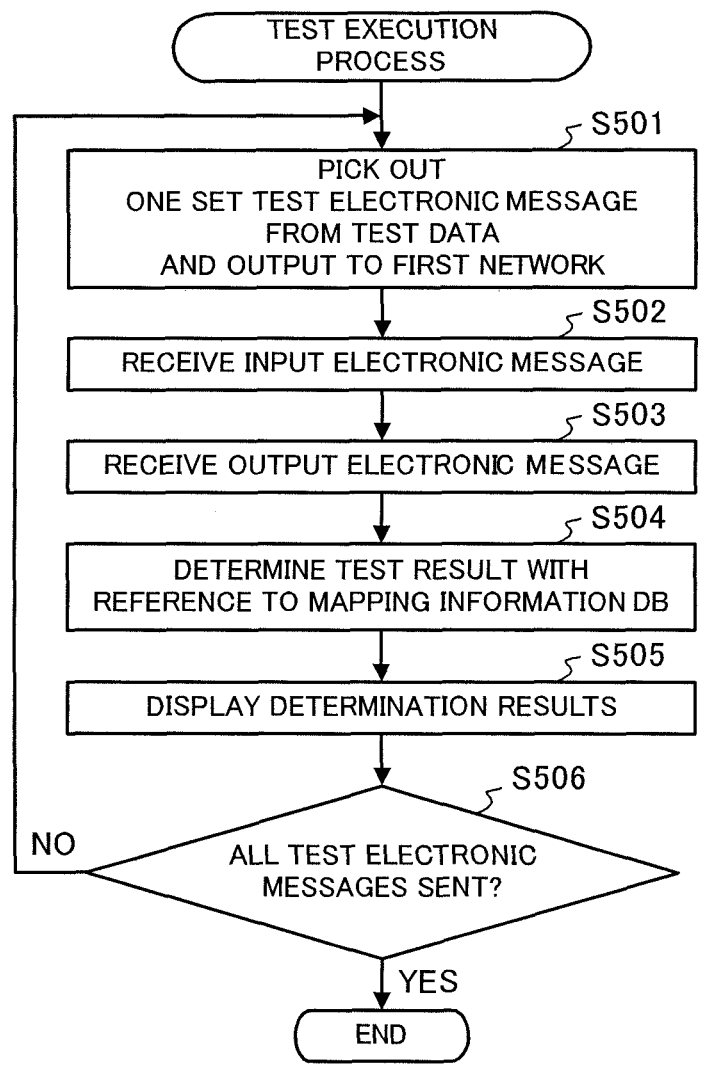
FIG. 31 is a flowchart showing a proceeding of a test execution process of Embodiment 2.

Next, a test execution process is described with reference to the flowchart in FIG. 31. This process is started by a prescribed operation being accomplished by the operator after the conclusion of the above-described test electronic message creation process. Or, it would be fine for this process to start automatically after the conclusion of the test electronic message creation process.

First, the electronic message sender 210 reads the test data from the test data storage 209. Then, the electronic message sender 210 picks out one test electronic message set in the test data and outputs such to the first network 50 (step S501).

The first electronic message receiver 201 receives test electronic messages output to the first network 50, that is to say input electronic messages (step S502). In addition, the second electronic message receiver 202 receives electronic messages output to the second network 60 from the gateway device 30, that is to say output electronic messages (step S503). The electronic messages respectively received by the first electronic message receiver 201 and the second electronic message receiver 202 are supplied to the electronic message analyzer 203. The electronic message analyzer 203 extracts necessary information from the supplied electronic messages, creates electronic message information by appending the reception date and time to this, and stores the result in the received electronic message storage 204.

The test result determiner 211 reads the electronic message information stored in the received electronic message storage 204 at prescribed time intervals, and accomplishes a determination of whether or not the test results are normal, with reference to the mapping information DB 206 (step S504). That is to say, whether or not the set of input/output electronic messages has a correct relationship is determined with reference to the mapping information DB 206. When an input electronic message is an abnormal electronic message, and when an output electronic message for the input electronic message is not detected, the test results are determined to be normal, and when such is not the case, the determination is that the result is abnormal. The test result determiner 211 supplies to the display 212 information including the set of input/output electronic messages that was the target of determination and the determination results thereof.

The display 212 displays the above-described information supplied from the test result determiner 211 in a prescribed format (step S505). At this time, it is fine to display the set of input/output electronic messages determined to be abnormal with emphasis compared to the set of input/output electronic messages determined to be normal in order to make visual confirmation easier.

When all of the test electronic messages set in the test data have been sent by the electronic message sender 210 (step S506: Yes), the test execution process concludes. On the other hand, when all of the test electronic messages set in the test data have not been sent (step S506: No), the electronic message sender 210 again executes the process in step S501 after a prescribed time has elapsed.

As explained above, with the network test device 200 of this embodiment, test data for testing the gateway device 30 is automatically created and determination of test results is accomplished automatically, so it is possible to greatly reduce the burden on the operator.

In addition, by analyzing electronic messages actually input into the gateway device 30 and electronic messages output from the gateway device 30, a mapping information DB 206 indicating the correlation between input electronic messages and output electronic messages is constructed and this mapping information DB 206 is used in tests. Accordingly, it is possible to execute appropriate tests in accordance with the actual scene, making it possible to improve maintenance accuracy.

As described above, there are various methods of entering the information recorded in the objective information DB 207. For example, it would be fine for the network test device 200 to collect the actual input electronic messages and output electronic messages during operation of the equipment management system and to construct the object information DB 207 based on the information obtained from those collected electronic messages.

Or, it would be fine for the object information DB 207 to be constructed based on prescribed setting files input via an undepicted external inputter/outputter (for example, an interface for connecting with external device such as a USB (Universal Serial Bus) and/or the like) with which the network test device 200 is provided.

Or, it would be fine for the network test device 200 and the gate device 30 to be connected via a prescribed communication cable and/or the like so as to be capable of data communication (wireless communication would be fine as well), the network test device 200 to acquire information related to the object, properties and property values from the gateway device 30, and the object information DB 207 to be constructed on the basis of that information.

In addition, in the above-described embodiment, the mapping information DB 206 was constructed by outputting electronic messages set in mapping information creation data prepared in advance to the first network 50 and analyzing the set of input/output electronic messages generated through this, but this method is intended to be illustrative and not limiting. For example, the mapping information creator 205 may construct the mapping information DB 206 by analyzing the set of actual input/output electronic messages during operation of that equipment management system.

Embodiment 3

Next, Embodiment 3 of the present invention is described. In this description, constituent components in common with Embodiment 1 and Embodiment 2 are labeled with the same reference signs and explanation of such is omitted.

The configuration of the equipment management system that is the test target of the network test device according to this embodiment is the same as in Embodiment 2 (see FIG. 22). In addition, a hardware configuration of the network test device in this embodiment is similar to a hardware configuration of the network test device 200 in Embodiment 2.

Figure 32:
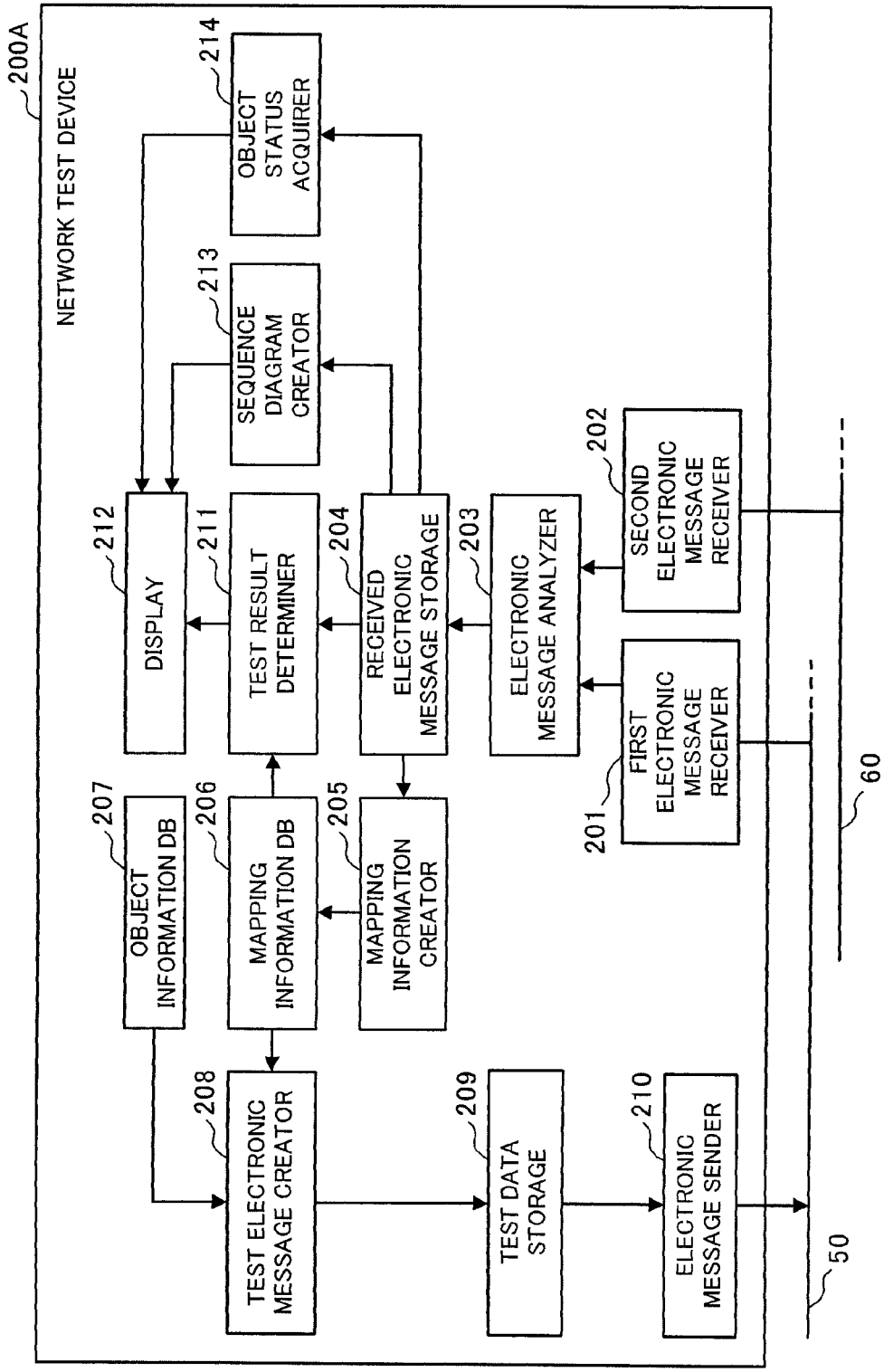
FIG. 32 is a block diagram showing a composition of a network test device according to Embodiment 3 of the present invention.

FIG. 32 is a block diagram showing a functional composition of a network test device 200A according to this embodiment. As shown in FIG. 32, the network test device 200A comprises the functional composition of the network test device 200 according to Embodiment 2 (see FIG. 23) to which have been further added a sequence diagram creator 213 and an object status acquirer 214.

Figure 33:
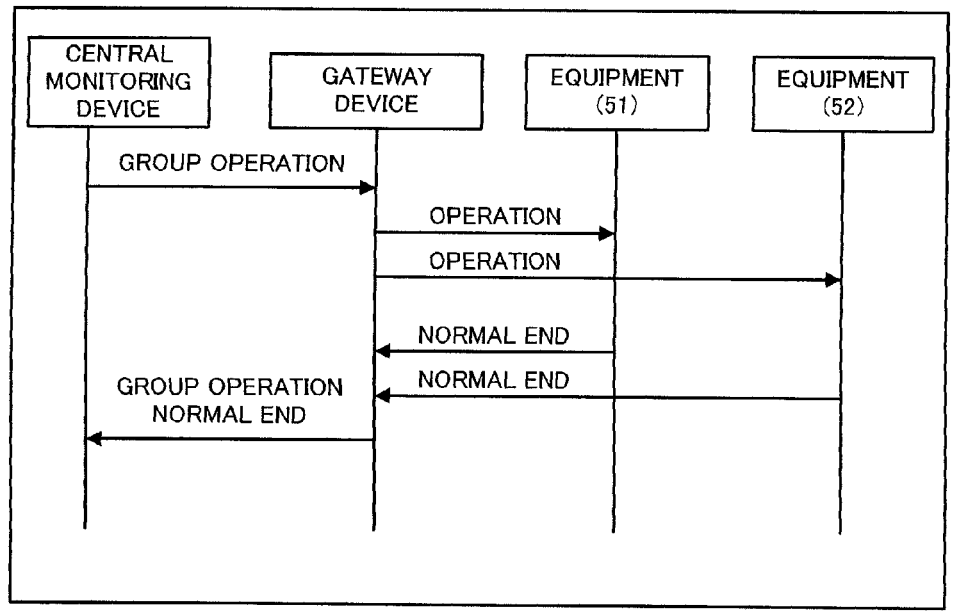
FIG. 33 is a drawing showing one example of a sequence diagram screen.

The sequence diagram creator 213 reads electronic message information stored in the received electronic message storage 204 at each prescribed time during the test execution process and creates sequence diagram data indicating the exchange of electronic messages among the equipment. The sequence diagram creator 213 supplies the created sequence diagram data to the display 212. The display 212 displays for example on an LCD monitor a sequence diagram screen indicating the sequence diagram data supplied from the sequence diagram creator 213. FIG. 33 shows one example of the sequence diagram screen displayed by the display 212.

In the example of FIG. 33, the following results are exhibited. (1) An electronic message (test electronic message) requesting running of equipment (40A and 40B) belonging to group 1 is received from the first network 50 side by the gateway device 30. (2) Electronic messages requesting running are sent by the gateway device 30 to the equipment 40A and 40B with respect to that test electronic message. (3) Response electronic messages indicating normal conclusion are received by the gateway device 30 from the respective equipment 40A and 40B. (4) Response electronic messages indicating that the equipment (40A and 40B) belonging to group 1 has normally concluded the process for running request are sent to the first network 50 side (that is to say, to the central monitoring device 20) by the gateway device 30.

It would be fine for the sequence diagram creator 213 to create sequence diagram data so as to follow in real time each time electronic messages are received by the first electronic message receiver 201 and the second electronic message receiver 202, and to supply such to the display 212.

Figure 34:
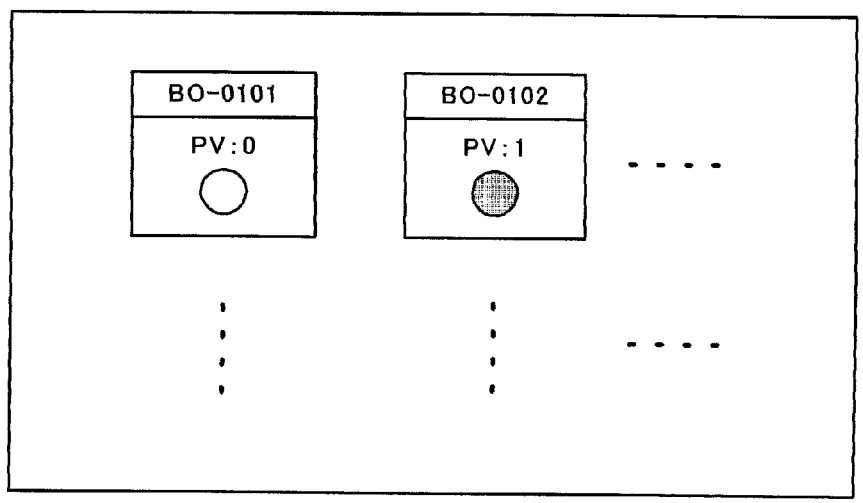
FIG. 34 is a drawing showing one example of an object status screen.

The object status acquirer 214 reads electronic message information stored in the received electronic message storage 204 at each prescribed time in the test execution process and acquires the status of each object. Furthermore, the object status acquirer 214 creates object status display data for displaying in a prescribed format data indicating the status of each object acquired and supplies the object status display data created to the display 212. The display 212 displays an object status screen indicating the object status display data supplied from the object status acquirer 214 for example on an LCD monitor. FIG. 34 shows one example of the object status screen displayed by the display 212.

It would be fine for the object status acquirer 214 to create the object status display data so as to follow in real time and supply such to the display 212 each time an electronic message is received by the first electronic message receiver 201 and the second electronic message receiver 202.

In the example in FIG. 34, the fact that the present value property (Present_Value) of the object "BO0101" is "0" (stopped) is shown, and the fact that the present value property of the object "BO0102" is "1" (operating) is shown. As shown in this example, visibility by the operator is improved if the properties of the object whose property values are shown as either of two values (0 or 1) are shown by prescribed marks, for example an empty circle or a circle filled in with a prescribed color, and or the like, along with the property value.

Figure 35:
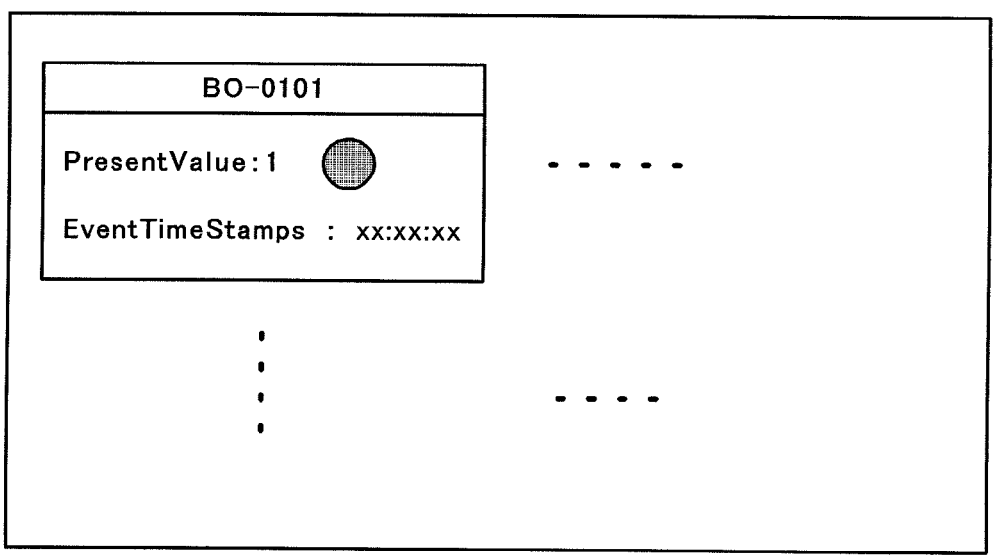
FIG. 35 is a drawing showing another example of an object status screen.

As shown in FIG. 35, naturally it would be fine to display multiple property values for a single object.

In addition, it would be fine to display as text the contents indicated by that property value (for example, "cooling operation") along with the property value.

Depending on the command classification indicated by the object, there may be cases in which no response electronic message returns from the equipment side. Accordingly, for an object for which the response electronic message has not returned, the object status acquirer 214 acquires the status of that object based on the request electronic message accompanying change in the property value output to the second network 60 side from the gateway device 30. On the other hand, for an object for which a response electronic message has returned, it would be fine for the object status acquirer 214 to acquire the status of that object based on the response electronic message output to the first network 50 side from the gateway device 30, or to acquire the status of that object based on the request electronic message accompanying change in the property value output to the second network 60 side from the gateway device 30.

As described above, with the network test device 200A according to this embodiment, the functions of the network test device 200 according to the embodiment are obtained and furthermore a function displaying a sequence diagram and a function displaying the object status are obtained. Accordingly, it is possible for the operator to easily and reliably recognize test results and/or the like, and it is possible to anticipate further increases in the efficiency of verification work.

The present invention is not limited to the above-described embodiments, for various variations are possible without deviating from the scope of the present invention.

For example, it is possible to cause an existing personal computers (PC) and/or the like to function as a network analysis assistance device or a network test device according to the present invention by applying the programs respectively executed by the network analysis assistance device 10 according to Embodiment 1, the network test device 200 according to Embodiment 2 and the network test device 200A according to Embodiment 3 to the PC and/or the like.

The method of distributing this kind of program is arbitrary, and for example it would be fine to distribute the program by storing such on a computer-readable recording medium such as a flexible disk, CD-ROM (Compact Disk Read-Only Memory), DVD (Digital Versatile Disk), MO (Magneto Optical Disk), memory card and/or the like. Or, it would be fine to store the above-described program on a disk device and/or the like possessed by a server device on a communication network such as the Internet and/or the like, and to distribute such from this server device via that communication network by overlaying the above-described program on carrier waves.

In this case, when the above-described functions according to the present invention are realized by being split between an OS (Operating System) and application programs or through cooperation between an OS and applications, it would be fine for only the application program portion to be stored and distributed via a recording medium.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application No. 2011-93538, filed on Apr. 19, 2011, and Japanese Patent Application 2011-142321, filed on Jun. 27, 2011, the entire disclosures of which are incorporated by reference herein

INDUSTRIAL APPLICABILITY

The present invention is appropriately utilized in maintenance work on equipment management systems installed inside buildings.

REFERENCE SIGNS LIST

20 Network analysis assistance device
30 Central monitoring device
31 Gateway device
31 Table supplier
40, 40A-40F Equipment
50 First network (equipment management network)
60 Second network (equipment network)
70, 80 Communication cables
90 Recording medium
101 First electronic message collector
102 Second electronic message collector
103 First storage
104 Second storage
105 Electronic message associator
106 Status analyzer
107 Display
108 Controller
109 Table acquirer
111 First electronic message receiver
112 First electronic message analyzer
121 Second electronic message receiver
122 Second electronic message analyzer
151, 155 Association analyzer
152 Mapping table
153 Request-response rules table
154 Instance correspondence rules table 156 Mapping information estimator and learner
157 Mapping information accumulator
158 Request-response rule estimator and learner
159 Request-response rule accumulator
160 Instance correspondence rule estimator and learner
161 Instance correspondence rule accumulator
200 Network test device
201 First electronic message receiver
202 Second electronic message receiver
203 Electronic message analyzer
204 Received electronic message storage
205 Mapping information creator
206 Mapping information DB
207 Object information DB
208 Test electronic message creator
209 Test data storage
210 Electronic message sender
211 Test result determiner
212 Display
213 Sequence diagram creator
214 Object status acquirer

The invention claimed is:

1. A network test device for testing operation of a gateway device connecting a first network and a second network, this network test device comprising:
   a central processing unit (CPU) executing programs stored in a memory to provide:
   a first electronic message receiver that be connected to the first network for receiving electronic messages traveling on the first network;
   a second electronic message receiver that be connected to the second network for receiving electronic messages traveling on the second network;
   a received electronic message storage that stores electronic messages respectively received by the first electronic message receiver and the second electronic message receiver;
   a mapping information creator that estimates the correlation between input electronic messages input into the gateway device from the first network and output electronic messages output on the second network from the gateway device, based on multiple electronic messages stored in the received electronic message storage and creates mapping information consisting of information obtained as a result of estimation;
   an object information database in which properties and property values are correlated in levels for all or a portion of the objects managed by the gateway device;
   a test electronic message creator that creates an input electronic message for test based on the mapping information and the object information database;
   an electronic message sender that outputs the input electronic message for test to the first network; and
   a test result determiner that determines whether or not the test result is normal by determining whether or not the relationship between an input electronic message and one or multiple output electronic messages is correct with reference to the mapping information after output of the input electronic message for test by the electronic message sender.

2. The network test device according to claim 1, further comprising a display that displays results of the determination by the test result determiner.

3. The network test device according to claim 1, wherein the mapping information indicates the correlation between objects included in the input electronic messages and command classifications and equipment addresses included in the output electronic messages.

4. The network test device according to claim 3, wherein the mapping information creator acquires sets of input-output electronic messages by picking out, after the input electronic message is input to the gateway device, from the received electronic message storage, all the output electronic messages output from the gateway within a prescribed time and by performing correlation processing to the input electronic message for all the input electronic messages, and generates the mapping information by picking up, from among the sets of input-output electronic messages acquired, the sets of input-output electronic messages in which the equipment addresses and the command classifications of the output electronic messages are common and by detecting common points in the input electronic messages from among the sets of input-output electronic messages picked up.

5. The network test device according to claim 1, wherein:
   input electronic messages for normal test whose property values are normal and input electronic messages for abnormal test whose property values are not normal are included in the input electronic messages for test; and
   the test result determiner determines that the test result is normal when no output electronic message corresponding to the input electronic message for abnormal test is stored in the received electronic message storage, and determines that the test result is abnormal when at least one output electronic message corresponding to the input electronic message for abnormal test is stored in the received electronic message storage.

6. The network test device according to claim 2, further comprising:
   a sequence diagram creator that creates a sequence diagram showing the order of handling associated electronic messages between the first network and the second network via the gateway device, based on one or multiple electronic messages stores in the received electronic message storage after output of the input electronic message for test by the electronic message sender;
   wherein the display displays the sequence diagram created by the sequence diagram creator.

7. The network test device according to claim 2, further comprising:
   an object status acquirer that acquires the status of objects included in the input electronic messages, based on one or multiple electronic messages stored in the received electronic message storage after output of the input electronic message for test by the electronic message sender;
   wherein the display displays in a prescribed format the status of the objects acquired by the object status acquirer.

8. A network test method for testing operation of a gateway device connected to a first network and a second network, the network test method comprising:
   a first electronic message receiving step that receives electronic messages traveling on the first network;
   a second electronic message receiving step that receives electronic messages traveling on the second network;
   a received electronic message storing step that stores in a received electronic message storage electronic messages respectively received by the first electronic message receiving step and the second electronic message receiving step;

a mapping information creation step that estimates the correlation between input electronic messages input into the gateway device from the first network and output electronic messages output on the second network from the gateway device, based on multiple electronic messages stored in the received electronic message storage, and creates mapping information consisting of information obtained as a result of estimation;

a test electronic message creation step that creates an input electronic message for test based on the mapping information and an object information database in which properties and property values are correlated in levels for all or a portion of the objects managed by the gateway device;

an electronic message sending step that outputs the input electronic message for test to the first network; and a test result determining step that determines whether or not the test result is normal by determining whether or not the relationship between an input electronic message and one or multiple output electronic messages is correct with reference to the mapping information after output of the input electronic message for test in the electronic message sending step.

9. A non-transitory computer-readable recording medium having stored thereof a network test program for testing operation of a gateway device connected to a first network and a second network, this network test program:

a first electronic message receiving step that receives electronic messages traveling on the first network;

a second electronic message receiving step that receives electronic messages traveling on the second network;

a received electronic message storing step that stores in a received electronic message storage electronic messages respectively received in the first electronic message receiving step and the second electronic message receiving step;

a mapping information creation step that estimates the correlation between input electronic messages input into the gateway device from the first network and output electronic messages output on the second network from the gateway device, based on multiple electronic messages stored in the received electronic message storage, and creates mapping information consisting of information obtained as a result of estimation;

a test electronic message creation step that creates an input electronic message for test based on the mapping information and an object information database in which properties and property values are correlated in levels for all or a portion of the objects managed by the gateway device;

an electronic message sending step that outputs the input electronic message for test to the first network; and a test result determining step that determines whether or not the test result is normal by determining whether or not the relationship between an input electronic message and one or multiple output electronic messages is correct with reference to the mapping information after output of the input electronic message for test in the electronic message sending step.

10. The network test device according to claim 4, wherein the mapping information creator detects the common points in the input electronic messages from among the sets of input-output electronic messages picked up by arranging in a prescribed order objects of each input electronic message from among the sets of input-output messages picked up and dividing each of the objects into parts and taking a difference of the objects adjacent to each other.

11. The network test device according to claim 1, wherein the multiple electronic messages stored in the received electronic message storage are actual messages sent from the first network to the second network and sent from the second network to the first network.

12. The network test method according to claim 8, wherein the multiple electronic messages stored in the received electronic message storage are actual messages sent from the first network to the second network and sent from the second network to the first network.

13. The non-transitory computer-readable recording medium according to claim 9, wherein the multiple electronic messages stored in the received electronic message storage are actual messages sent from the first network to the second network and sent from the second network to the first network.

* * * * *